United States Patent
Powell et al.

(10) Patent No.: US 7,460,305 B2
(45) Date of Patent: Dec. 2, 2008

(54) SCANNED-BEAM HEADS-UP DISPLAY AND RELATED SYSTEMS AND METHODS

(75) Inventors: Karlton D. Powell, Lake Stevens, WA (US); Hakan Ürey, Istanbul (TR); Amjad Malik, Bothell, WA (US); Russell J. Hannigan, Sammamish, WA (US)

(73) Assignee: Microvision, Inc., Redmond, WA (US)

( * ) Notice: Subject to any disclaimer, the term of this patent is extended or adjusted under 35 U.S.C. 154(b) by 125 days.

(21) Appl. No.: 11/499,396

(22) Filed: Aug. 4, 2006

(65) Prior Publication Data

US 2007/0103747 A1 May 10, 2007

(51) Int. Cl.
*G02B 27/14* (2006.01)
(52) U.S. Cl. .......................... 359/630; 359/13; 359/900
(58) Field of Classification Search ................. 359/630, 359/13, 900
See application file for complete search history.

(56) References Cited

U.S. PATENT DOCUMENTS

| | | | | |
|---|---|---|---|---|
| 5,546,492 | A * | 8/1996 | Ansley et al. | 385/116 |
| 5,757,544 | A | 5/1998 | Tabata et al. | |
| 5,864,432 | A | 1/1999 | Deter et al. | |
| 6,381,072 | B1 * | 4/2002 | Burger | 359/622 |
| 2001/0000124 | A1 | 4/2001 | Killin et al. | |

OTHER PUBLICATIONS

Powell Karlton et al.; "Exit Pupil Expander: Image Quality Performance Enhancements and Environmental Testing Results", Proc SPIE Int Soc Opt Eng; Proceedings of SPIE—The International Society for Optical Engineering 2003, vol. 5079, 2003, pp. 308-320.
Power K D et al.; "Novel Approach to Exit Pupil Expansion for Wearable Displays", Proceedings of the SPIE—The International Society for Optical Engineering SPIE—Int. Soc. Opt. Eng USA, vol. 4711, 2002, pp. 235-248.
Urey H et al.; "Microlens Array-based Exit Pupil Expander for Full-Color Display Applications", Proceedings of the SPIE—The International Society for Optical Engineering SPIE-Int. Soc. Opt. Eng USA, vol. 5456, No. 1, 2004, pp. 227-238.
International Search Report for PCT/US2005/003730 dated May 19, 2005.

* cited by examiner

*Primary Examiner*—Hung X Dang
*Assistant Examiner*—Vipin M Patel
(74) *Attorney, Agent, or Firm*—Kevin D. Wills

(57) ABSTRACT

A heads-up display that includes a scanner and a projection assembly. The scanner generates an image by sweeping a beam of electromagnetic energy, and the projection assembly directs the image into a predetermined viewing space having a region with a substantially uniform intensity profile. Such a heads-up display can often be made smaller than a conventional heads-up display, and can often generate an image having a higher quality than an image generated by a conventional display. Furthermore, one can often calibrate and recalibrate such a display without physically modifying or replacing a component of the display or of a vehicle incorporating the display.

17 Claims, 18 Drawing Sheets

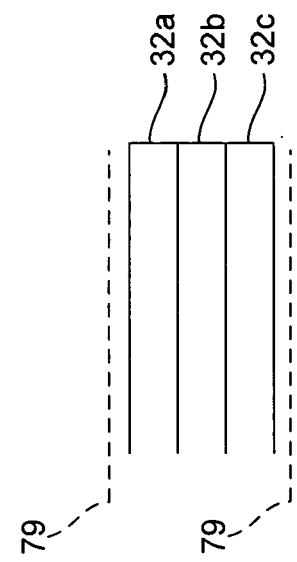
FIG. 11B
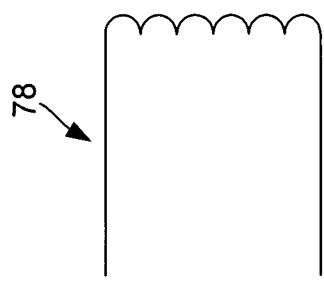
FIG. 9C
FIG. 11A
FIG. 9A
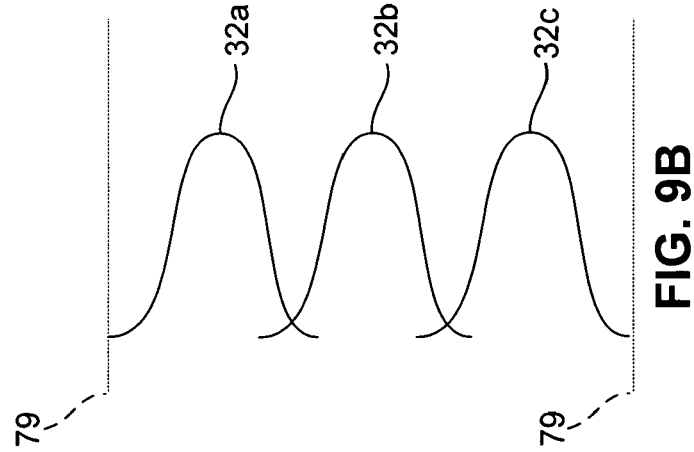
FIG. 9B

US 7,460,305 B2

SCANNED-BEAM HEADS-UP DISPLAY AND RELATED SYSTEMS AND METHODS

The invention was made with United States Government support. The United States Government may have certain rights in this invention.

CLAIM OF PRIORITY

This application claims priority to co-pending International Application number PCT/US2005/003730 filed on Feb. 4, 2005 which claims priority to U.S. Provisional Application Ser. No. 60/541,619 filed on Feb. 4, 2004, and U.S. Provisional Application Ser. No. 60/565,059 filed on Apr. 23, 2004, both of which are incorporated by reference.

BACKGROUND OF THE INVENTION

Referring to FIG. 1, a heads-up display 10 typically generates a virtual image of one or more gauges, e.g., a speedometer and an odometer (not shown), for viewing by an operator 12 of a vehicle such as an automobile 14. The term "heads up" indicates that the operator 12 need not lower his gaze to a dashboard 16 to view the gauges. That is, the operator 12 can keep his head up and his "eyes on the road" while viewing the gauges. Therefore, the display 10 is an added convenience that also increases the level of safety with which the operator 12 can operate the vehicle 14.

In operation, the heads-up display 10 generates and projects the virtual image of the one or more gauges (not shown) onto a windshield, i.e., a wind screen 18, which reflects the image into the eyes 20 of the operator 12 such that the image appears within the operator's field of view (FOV), sometimes appearing to be at some apparent distance beyond the wind screen. For example, the display 10 may include a light-emitting-diode (LED), liquid crystal (LCD), vacuum fluorescent, or other display technology (not shown) for generating the image, and an optical train (not shown in FIG. 1) for projecting the image onto the wind screen 18.

Typically, the operator 12 is best able to view the virtual image while his eyes 20 are within a three-dimensional viewing space 22, which is sometimes called an eye box. Although the dimensions (e.g., height, width, and/or depth) of the viewing space 22 are typically fixed, they are typically sufficient to accommodate the anticipated ranges of up-and-down, side-to-side, and front-to-back movements of the operator's head 20 while the operator is operating the automobile 14. Furthermore, because the range of operator heights is relatively large (e.g., 5 feet tall-7 feet tall), the display 10 may allow the operator 12 to adjust the vertical position of the viewing space 22 so as to align the viewing space with the operator's eyes 20.

Unfortunately, the typical heads-up display 10 may have several shortcomings. For example, the display 10 may be relatively bulky, and may consume a relatively large amount of power. Furthermore, the quality of the virtual image within the viewing space 22 may be poor. Moreover, because each wind screen 18, even for the same model car, may be slightly different than every other wind screen, the procedure for calibrating the display 10 for each new vehicle may be relatively complex, and may include physically modifying or replacing one or more parts of the display, or perhaps either replacing the entire heads-up display or wind screen. Furthermore, if one ever needs to repair or replace the windscreen, the need to recalibrate the display 10 by modifying or replacing a part or all of the display may significantly increase the time and expense required for an otherwise ordinary repair.

SUMMARY OF THE INVENTION

One aspect of the invention is a heads-up display that includes a scanner assembly and a projection assembly. The scanner assembly generates an image by sweeping a beam of electromagnetic energy, and the projection assembly directs the image into a predetermined viewing space having a region with a substantially uniform intensity profile.

Such a heads-up display can often be made smaller than a conventional heads-up display, and can often generate an image having a higher quality than an image generated by a conventional display. Furthermore, one can often calibrate and recalibrate such a display without physically modifying or replacing a component of the display or of a vehicle incorporating the display.

BRIEF DESCRIPTION OF THE DRAWINGS

The foregoing aspects and many of the attendant advantages of this invention will become more readily appreciated as the same become better understood by reference to the following non-limiting detailed description, when taken in conjunction with the accompanying drawings, wherein:

FIG. 9A is a two-dimensional plot of a beam-envelope intensity profile generated by the exit-pupil expander of FIG. 7 according to an embodiment of the invention.

FIG. 9B is a two-dimensional plot of a beamlet intensity profile generated by the heads-up display 40 of FIG. 3 for a scanned beam having a Gaussian intensity profile according to an embodiment of the invention.

FIG. 9C is a two-dimensional plot of the beam intensity profile resulting from the combination of the beam-envelope intensity profile of FIG. 9A and the beamlet intensity profile of FIG. 9B according to an embodiment of the invention.

FIG. 11A is a two-dimensional plot of a beamlet intensity profile generated by the heads-up display 40 of FIG. 3 for a scan beam having a top-hat intensity profile according to an embodiment of the invention.

FIG. 11B is a two-dimensional plot of a uniform beam intensity profile resulting from the combination of the beam-envelope intensity envelope of FIG. 9A and the beamlet intensity profile of FIG. 11B according to an embodiment of the invention.

DETAILED DESCRIPTION

The following discussion is presented to enable a person skilled in the art to make and use the invention. The general principles described herein may be applied to embodiments and applications other than those detailed below without departing from the spirit and scope of the present invention. Therefore the present invention is not intended to be limited to the embodiments shown, but is to be accorded the widest scope consistent with the principles and features disclosed or suggested herein.

The Viewing Space

Figure 1:
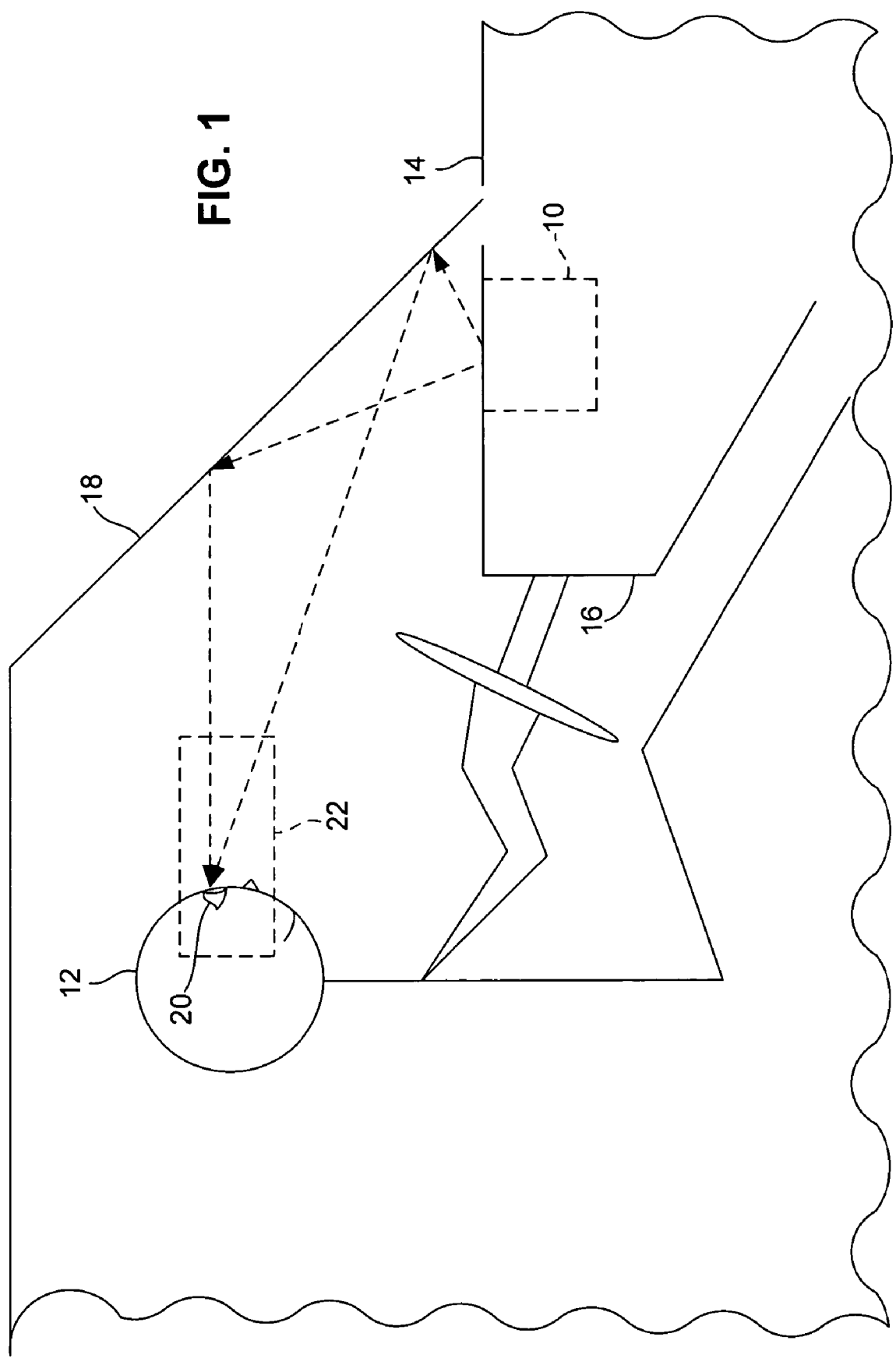
FIG. 1 is a side view with portions broken away of an operator within a vehicle that includes a conventional heads-up display.
Figure 2:
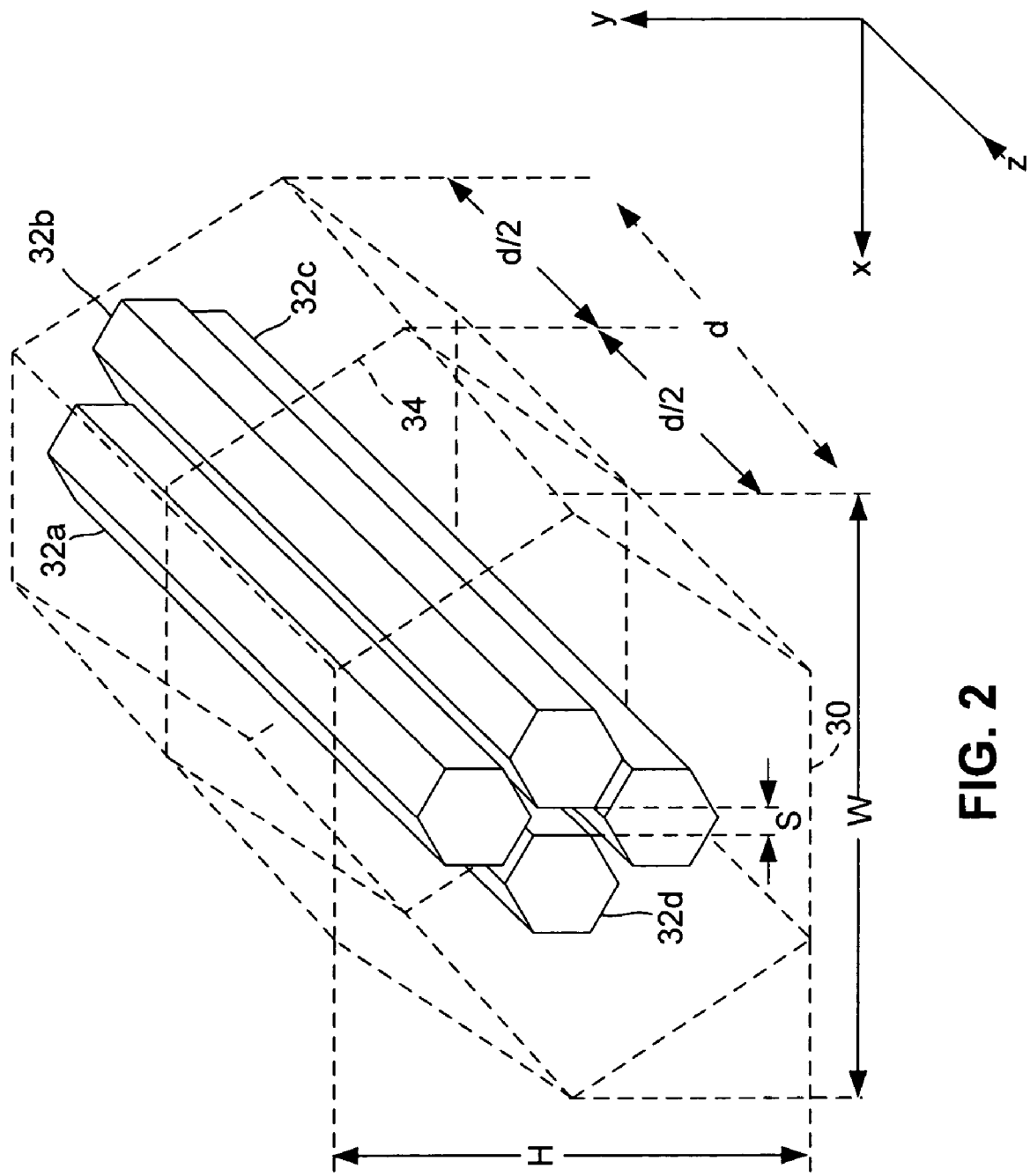
FIG. 2 is an isometric view of a heads-up-display viewing space (eye box) according to an embodiment of the invention.

FIG. 2 is an isometric view of a viewing space 30 according to an embodiment of the invention. Generally, it is desired that a heads-up display, such as the scanned-beam heads-up display discussed below in conjunction with FIGS. 3-22, generate the viewing space 30 such that parameters of the viewing space are within respective predetermined ranges that allow a virtual image to have an acceptable and substantially uniform quality regardless of the position of the operator's eyes within the viewing space. Therefore, some of these viewing-space parameters, as well as desired values for these parameters, are discussed below in conjunction with FIG. 2. Following the discussion of the viewing space parameters is a discussion, in conjunction with FIGS. 3-22, of a heads-up display that can achieve desired parameter values.

Still referring to FIG. 2, the viewing space 30 has a height h (y dimension), a width w (x dimension), and a depth d (z dimension), and the virtual image perceived when the eye is within the viewing space 30 is formed by diffraction orders, i.e., beamlets 32, which, at any point in time, each carry the same pixel of the virtual image—for clarity, only four beamlets 32a-32d are shown. Therefore, as long as the operator's eyes (not shown in FIG. 2) are capturing the light energy of at least one of the beamlets 32, the operator will perceive the pixel of the image. During the generation of the center pixel of the image, the beamlets 32 are positioned approximately parallel to the z axis as shown in FIG. 2. During the generation of other pixels, the beamlets 32 are canted (canting not shown in FIG. 2) at slight angles relative to the z axis. That is, as the heads-up display (not shown in FIG. 2) scans the image pixel by pixel and line by line, the beamlets 32 effectively "pivot" up/down and left/right, within the FOV, from the nominal beamlet angle of the center-pixel position; it is this "pivoting" that causes one or more of the beamlets 32 to be scanned onto the retinas (not shown) of the operator's eyes. The location at which the beamlets 32 "pivot" is a cross section 34 that is coplanar with the x-y plane and that is located in the middle (d/2) of the viewing space 30 in the z dimension. Therefore, as a result of this "pivoting," the height h and the width w of the viewing space 30 (which includes beamlets from all pixels within the FOV) actually changes slightly as one moves out from the cross section 34 in either direction in the z dimension. But because this expansion is slight, describing the viewing space 30 as having constant values of h and w along the entire depth d is a good approximation.

Parameters of the viewing space 30 that affect the virtual image quality and uniformity include the aperture, the expanded-beam intensity profile, and the fill factor. The aperture of the viewing space 30 is of the same shape as that of the cross section 34. The expanded-beam intensity profile, which is discussed below in conjunction with FIGS. 3 and 7-12, is a plot of the relative expanded-beam intensity at each location within the viewing space, and the fill factor is a measure of the spacing S between adjacent beamlets 32. Ideally, the aperture of the viewing space 30 should match the x-y area within which an operator is likely to move his head, the expanded beam-intensity profile should be uniform throughout the viewing space, and the fill factor should be such that there are no visible gaps between adjacent beamlets 32.

The aperture of the viewing space 30 has an elongated hexagonal shape, which has been found to closely mimic the typical x-y area within which the operator may move his eyes while operating a vehicle (neither operator, eyes, nor vehicle shown in FIG. 2). The pattern of the beamlets 32, which is further discussed below in conjunction with FIGS. 7-8, defines the aperture of the viewing space 30. In this example, the beamlets 32 are in a hexagonal pattern having a compressed height h and an elongated width w as compared to a symmetrical hexagon—h is less than, i.e., is compressed relative to, w because for the exemplary application the horizontal range within which an operator might move his eyes while operating the vehicle is greater than the vertical range within which the operator typically moves his eyes. Consequently, the aperture of the viewing space 30 has a shape that accommodates relatively greater horizontal movement and relatively less vertical movement. In one example, the viewing space 30 has a height h≈150 millimeters, a width w≈200 millimeters, and a depth d≈400 millimeters. Other applications may be characterized by a range of operator eye positions that has a different shape. The aperture of the viewing space 30 may be similarly modified to accommodate such a different shape.

Still referring to FIG. 2, the expanded-beam intensity (i.e., brightness) profile within the viewing space 30 is substantially uniform. That is, the brightness of the image is substantially the same regardless of the position of the operator's eyes (not shown in FIG. 2) within the viewing space 30. A relatively uniform expanded-beam intensity profile allows the operator move his eyes within the viewing space 30 without perceiving, and thus being distracted by, a noticeable change in the image intensity. There are two primary factors that determine the expanded-beam intensity profile within the viewing space 30: the intensity profile of the beam envelope (not shown in FIG. 2), and the intensity profile of the beamlets 32. For many embodiments, the beamlets each have substantially the same intensity profile. As further discussed below in conjunction with FIGS. 9A-12, as long as the intensity profile of the beam envelope and the intensity profile of the beamlets 32 are both substantially uniform, then the expanded-beam intensity profile within the viewing space 30 is also substantially uniform. In one example, the brightest region of the expanded-beam intensity profile within the viewing space 30 is approximately 11% brighter than the dimmest region of the beam intensity profile within the viewing space. That is, $(I_{brightest} - I_{dimmest})/(I_{brightest} + I_{dimmest}) \leq \sim 11\%$.

The fill factor of the viewing space 30 is high enough to insure that an operator's eye (not shown in FIG. 2), while within the viewing space, captures at least one beamlet 32, and thus perceives the virtual image regardless of the eye's position within the viewing space. That is, there are no "holes" in the viewing space 30 where an operator can "lose" the image. The fill factor can range from 0% where the beamlets 32 do not exist, i.e., have a zero-diameter aperture, to 100% where the beamlets 32 are contiguous at all points of their respective peripheries such that there is no "empty" space between the beamlets, to greater than 100% where the beamlets 32 overlap. Although it is possible for the beamlets to overlap, it is assumed for purposes of this discussion that no such overlapping occurs. The aperture of the beamlets 32 controls the maximum fill factor of the viewing space 30. For example, with beamlets having a circular aperture, the maximum fill factor when the beamlets are packed with their diameters just tangent to one another is less than 100% because of the interstitial spaces between the circles. If beamlets 32 have a hexagonal shape, the beamlets may be closely packed within the viewing space 30 and have a fill factor of 100% without overlapping. Similarly, flattened hexagonal, square, rectangular, parallelogram, etc. beamlet shapes may be closely packed without overlapping. To ensure that an operator's eye receives at least one beamlet 32, the spacing S between the sides of adjacent beamlets is less than the smallest diameter of the eye's pupil (not shown in FIG. 2). In bright ambient conditions, the pupil's diameter may be as small as about 2 millimeters (mm). Consequently, when the spacing S is less than ~2 mm, the fill factor is high enough to ensure that there are no "holes" in the viewing space 30.

Still referring to FIG. 2, alternate embodiments of the viewing space 30 are contemplated. For example, the viewing space 30 and the beamlets 32 may have apertures other than hexagonal. Furthermore, the aperture of the beamlets 32 need not be a scaled-down version of the aperture of the viewing space 30. For example, the viewing space 30 may have an elongated hexagonal aperture and the beamlets 32 may have a symmetrical hexagonal aperture as shown in FIG. 2. Moreover, the expanded-beam intensity profile within the viewing space 30 may not be substantially uniform, yet may still yield an image of acceptable quality in at least some locations within the viewing space. In addition, the cross section 34 may be curved instead of planar. For example, the cross section 34 may have a curvature corresponding to the arc swept by the operator's eyes in one or both of the x and y dimensions. Furthermore, although only one cross section 34 is shown in FIG. 2, it is understood that the viewing space 30 includes an infinite number of cross sections that are parallel to the cross section 34. Moreover, the cross section where the beamlets 32 "pivot" may be located other than in the middle (d/2) of the viewing space 30. In addition, although described as comprising visible light, the beamlets 32 may include electromagnetic energy outside of the visible spectrum. For example, the beamlets 32 may include infrared energy such that the operator (not shown in FIG. 2) wears infrared goggles (not shown) to view the virtual image within the viewing space 30.

Heads-Up Display for Generating the Viewing Space of FIG. 2

Figure 3:
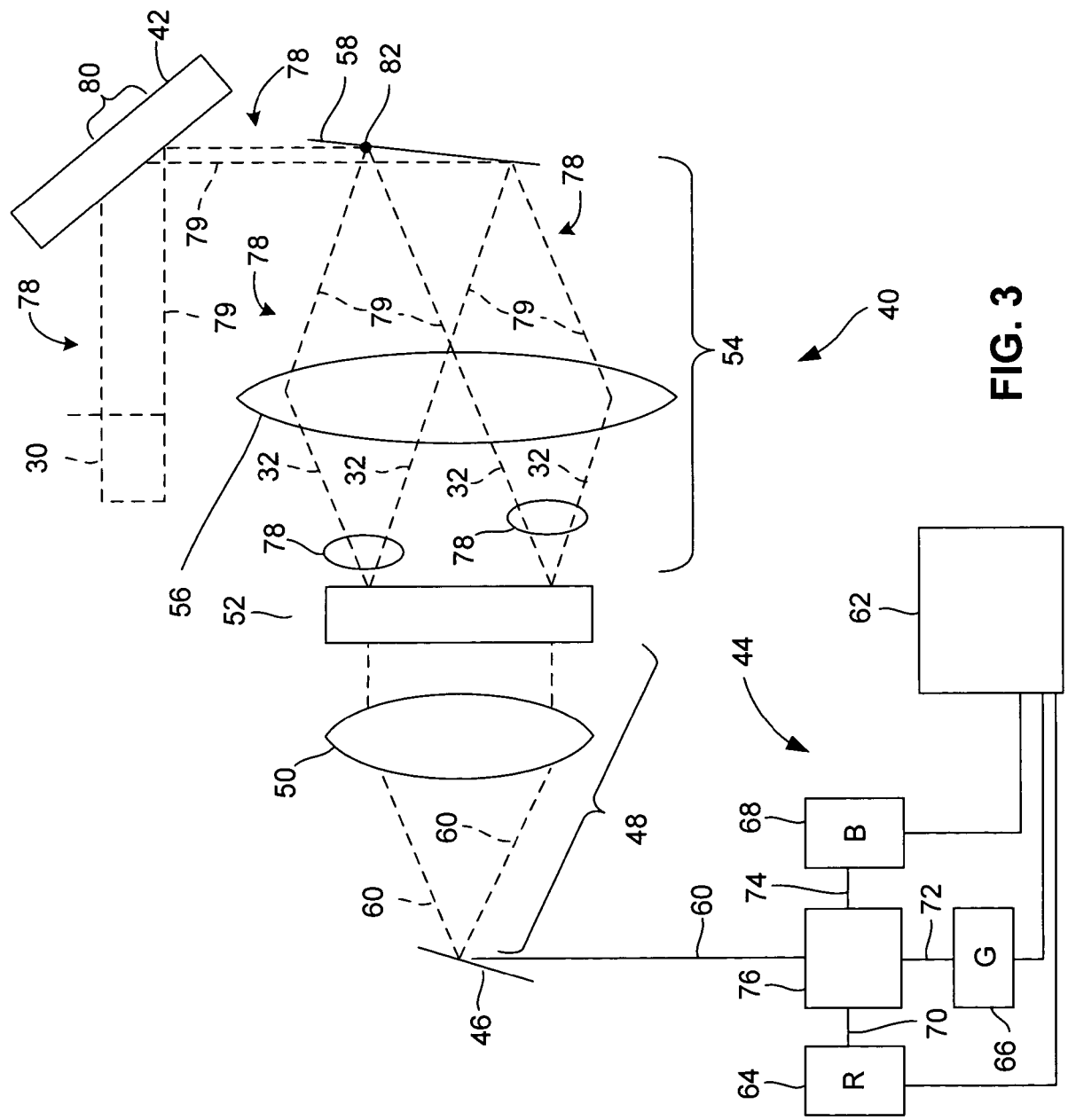
FIG. 3 is a diagram of a heads-up display system that can project an image into the viewing space of FIG. 2 according to an embodiment of the invention.

FIG. 3 is a diagram of a scanned-beam heads-up display 40, which is operable to generate the viewing space 30 of FIG. 2 according to an embodiment of the invention. Also shown is a wind screen 42 which the display uses as a reflector to direct the virtual image into the viewing space 30. By using a scanned beam to generate the virtual image, the display 40 may be smaller, have higher performance (eg, superior contrast, sharpness and brightness), be more energy efficient, and/or be easier to calibrate than conventional heads-up displays. Furthermore, where the display 40 includes substantially no scattering surfaces and the scaned beam comprises coherent electromagnetic energy such as laser light, visible speckle in the virtual image may be reduced or eliminated. Moreover, using the display 40 to generate a virtual image of vehicle information may allow one to simplify the physical vehicle information displays within the vehicle. For example, if the display 40 generates a virtual image of the fuel gauge, then one can omit a physical fuel gauge from the vehicle's dashboard.

Still referring to FIG. 3, the heads-up display 40 includes a beam generator 44, a scanner 46, a scanned-beam-conditioning assembly 48, which includes a lens 50, an exit-pupil expander 52, and a beam-projection assembly 54, which includes a lens 56 and a reflector 58 or a combined lens-reflector. Both the beam-conditioning assembly 48 and the beam-projection assembly 54 may be or include respective optical trains.

The beam generator 44 generates a color output beam 60, and includes image electronics 62, red (R), green (G), and blue (B) beam sources 64, 66, and 68 for respectively generating R, G, and B beams 70, 72, and 74, and a beam-combiner-and-conditioner assembly 76. Some heads-up displays may alternatively use a single color or a subset of R, G and B. The beam generator may also include other wavelengths of light, for example to further improve color gamut, brightness, etc.

The electronics 62 modulate the R, G, and B beam sources 64, 66, and 68, and thus the beams 70, 72, and 74, such that the output beam 60 has the desired intensity and color content for a pixel of the image that the electronics is currently generating. The electronics 62 may modulate the beam sources using time modulation, where a beam is full "on" for a predetermined portion of the pixel-generation time and full "off" for another portion of the pixel-generation time, or using intensity modulation, where the intensity of a beam is modulated to a predetermined level for an entire pixel-generation time.

The beam sources 64, 66, and 68 may be conventional R, G, and B lasers or light-emitting diodes (LEDs), and the beams 70, 72, and 74 may propagate to the beam-combiner-and-conditioner assembly 76 through the air (or other medium) or via an optical fiber (or other optical path). For example, coupling a laser beam from one of the beam sources 64, 66, or 68 to the assembly 76 via a single-mode optical fiber may improve the quality of the beam at the assembly as compared to a beam that propagates to the assembly through a medium such as air. Furthermore, coupling a laser beam to the assembly 76 via an optical fiber allows the corresponding beam source to be located remotely from the rest of the display 40, such as in the trunk of an automobile (not shown in FIG. 3). Remotely locating a beam source 64, 66, or 68 may be advantageous where the beam source is a gas laser or otherwise is relatively large or dissipates 30 a relatively large amount of heat. Alternatively, if a beam source 64, 66, or 68 is a semiconductor laser or LED, then it may be located near the assembly 76. Moreover, some of the beam sources 64, 66, and 68 may be disposed in locations remote from the assembly 76, and others of the beam sources may be disposed in locations local to the assembly.

The beam-combiner-and-conditioner assembly 76, which is further discussed below in conjunction with FIGS. 4-6, combines the R, G, and B beams 70, 72, and 74 into the output beam 60, and imparts to the output beam a top-hat intensity profile and the same hexagonal shape (or scaled version thereof) as the beamlets 32 of FIG. 2.

The scanner 46 sweeps the output beam 60 in two dimensions (e.g. vertical and horizontal) to generate the virtual image viewed by the operator (not shown in FIG. 3) in the viewing space 30—two positions of the swept output beam are shown emanating from the scanner in dashed line. The scanner 46 may be a conventional microelectromechanical system (MEMS) scanner, or other type of scanner. A MEMS scanner typically sweeps the output beam 60 sinusoidally, i.e., resonantly, in the horizontal dimension, and linearly in the vertical dimension, although a MEMS scanner may sweep the beam resonantly in the vertical dimension as well. The resonant operation allows the MEMS scanner to consume little power, and the relatively small size of the MEMS scanner may allow the heads-up display 40 to be more compact and lighter than conventional heads-up displays. Examples of a MEMS scanner suitable for use as the scanner 46 is further discussed in U.S. patent application Ser. No. 10/984,327, entitled MEMS DEVICE HAVING SIMPLIFIED DRIVE, invented by Randall B. Sprague et al., filed Nov. 9, 2004, which is hereby incorporated by reference.

The scanned-beam conditioning assembly 48 conditions the swept output beam 60 for input to the exit-pupil expander 52. For example, the lens 50 is a conventional telecentric lens that causes the swept output beam 60 to enter the exit-pupil expander 52 normal to the focal plane (not shown) of the expander regardless of the beam's angular position. Furthermore, as discussed in more detail below, the assembly 48 may include other conventional components such that at the input plane of the expander 52, the intensity profile of the beam 60 is the spatial Fourier Transform in both phase and amplitude of the beam's intensity profile at the output of the beam generator 44.

The exit-pupil expander 52, which is discussed further below in conjunction with FIGS. 7-18, converts the swept beam 60 at the expander's input plane into an expanded beam 78, which includes the beamlets 32 (FIG. 2) within a beam envelope 79—two positions of the beam envelope are shown in dashed line. The expanded beam 78 is a larger, i.e., expanded, version of the beam 60, and eventually forms the viewing space 30. That is, the expanded beam 78 effectively "sweeps out" the viewing space 30. More specifically, as the scanner 46 sweeps the beam 60, the beamlets 32 within the beam envelope 79 generate the image in the viewing space 30 by sweeping across the retinas of the operator's eyes (not shown in FIG. 3). As further discussed below, the expander 52 may be a diffractive, refractive, reflective, or combination optical element.

Figure 20:
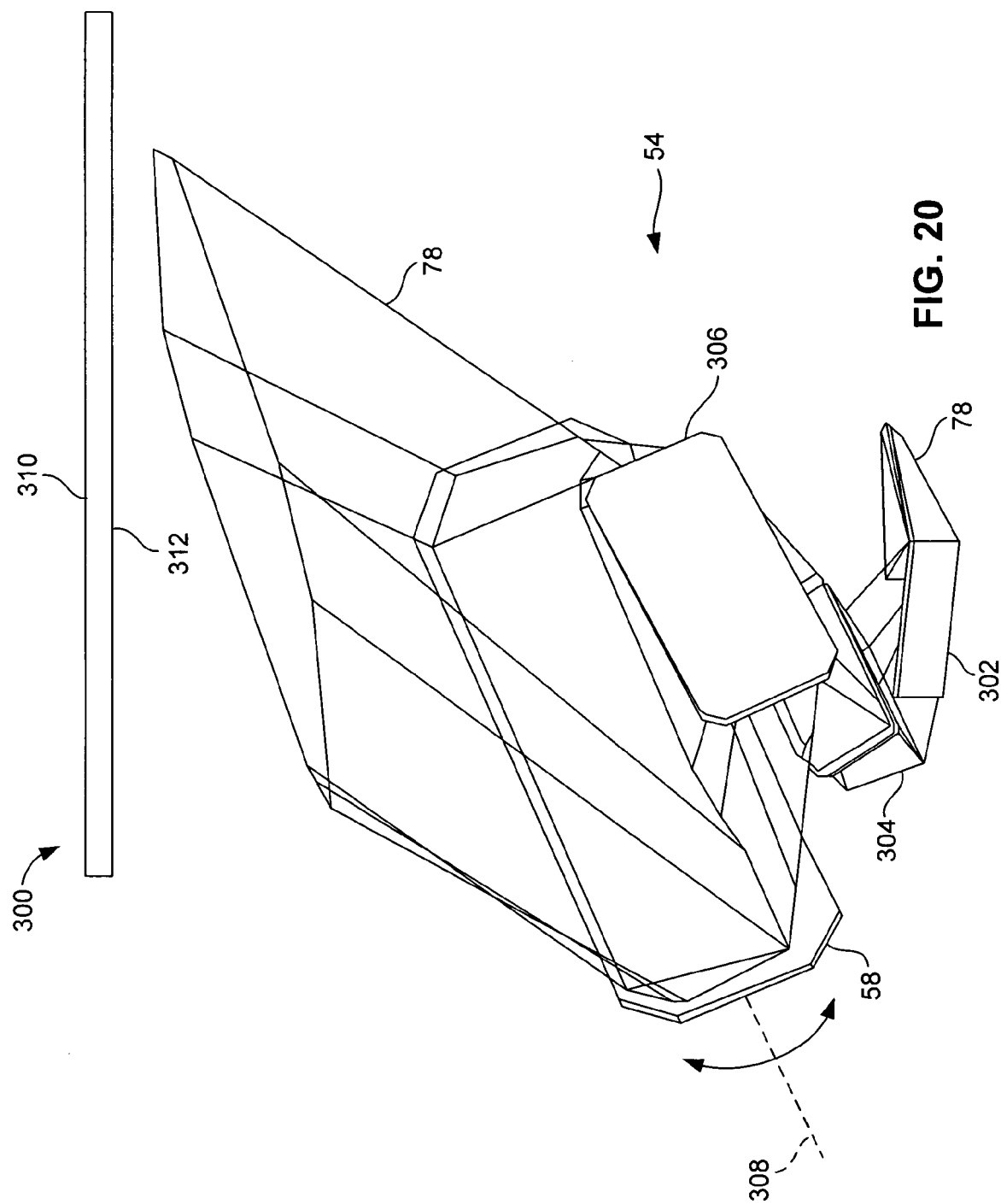
FIG. 20 is an isometric view of a portion of the projection assembly of FIG. 3 according to an embodiment of the invention.

The beam-projection assembly 54 conditions the expanded beam 78 from the exit-pupil expander 52 for direction into the viewing space 30 by the wind screen 42. For example, the lens 56 is a conventional focusing lens, and the reflector 58, which is discussed further below in conjunction with FIG. 20, is an aspheric mirror having a curvature designed to optically "match" the curvature of the wind screen 42. The assembly 54 may also include a negative-power lens (not shown in FIG. 3) at the output of the exit-pupil expander 52 to further expand the beam 78 before it propagates to the lens 56. Furthermore, as discussed in more detail below, the assembly 54 may include other conventional components such that at the cross section 34 (FIG. 2) of the viewing space 30, the intensity profile of the beam envelope 79 is the spatial Fourier Transform in both phase and amplitude of the intensity profile of the beam envelope at the output plane (not shown in FIG. 3) of the exit-pupil expander 52, and the intensity profile of the beamlets 32 is the spatial Fourier Transform in both phase and amplitude of the intensity profile of the scanned output beam 60 at the input plane (not shown in FIG. 3) of the exit-pupil expander.

Although the wind screen 42 need not be part of the heads-up display 40, it is typically the final optical component that directs the expanded beam 78 from the reflector 58 to the viewing space 30. For example, a region 80 of the wind screen 42 that directs the expanded beam 78 is usually located in the lower third of the wind screen, although other parts of the wind screen may be used. This region may optionally be treated with one or more optical coatings to enhance the wind screen's reflection of the expanded beam. For example, the region 80 may be treated with narrow-band optical coatings that reflect the R, G, and B wavelengths that compose the expanded beam 78 but that pass other wavelengths. It has been found that such coatings have a negligible affect on the level of the wind screen's transparency, and, therefore, have little or no adverse affect on the operator's ability to see through the region 80 of the wind screen 42.

Still referring to FIG. 3, the operation of the heads-up display 40 is discussed according to an embodiment of the invention.

The image electronics 62 modulates the beams 70, 72, and 74 to generate the pixels of the image to be scanned. A range of image aspect ratios may be used. In some examples, the image has an aspect ratio between approximately 2:1 and 3:1, for example, 600 pixels wide (horizontal (x) dimension) by 200 pixels high (vertical (y) dimension). In a typical automotive application where the heads-up display angular field of vehicle is 6×2 degrees, this translates into a resolution in the viewing space 30 of approximately 100 pixels per degree, which is greater than the approximately 60 pixels-per-degree resolution of the human eye. Such a high number of pixels-per-degree may be used to make text and graphics appear to the operator to have high definition and sharpness, compared to lower resolution displays. In some applications, a relatively high number of nominal pixels-per-degree can be used to adjust or compensate the shape of the image (for example, to compensate for wind screen curvature tolerances) without substantial loss of effective resolution visible to the eye.

The beam generator 44 generates from the modulated beams 70, 72, and 74 the output beam 60 having a substantially top-hat (i.e., substantially uniform) intensity profile and a hexagonal aperture that is substantially the same shape as the hexagonal aperture of the beamlets 32 (FIG. 2).

The scanner 46 vertically and horizontally sweeps the beam 60, which propagates to the exit-pupil expander 52 via the scanned-beam conditioning assembly 48.

The optical components of the beam-combining-and-conditioning assembly 76 and the scanned-beam conditioning assembly 48 together transform the top-hat intensity profile and hexagonal aperture of the beam 60 at the input plane of the exit-pupil expander 52 into the spatial Fourier Transform, in both phase and amplitude of the top-hat profile and hexagonal aperture at the input of the exit-pupil expander 52. Because the spatial Fourier Transform of a top-hat profile is a spatial sinc (sin(x)/x) function, the beam 60 has a two-dimensional sinc-like intensity profile at the input plane of the exit-pupil expander 52.

The exit-pupil expander 52 effectively converts the sinc-like intensity profile of the beam 60 at its input plane into the beam envelope 79, which also has a sinc-like intensity profile at the output plane of the expander. Furthermore, as discussed below in conjunction with FIG. 7, overlap of neighboring sinc-like outputs in the near-field of the expander 52 form beamlets 32 in the substantially uniform far field of the expander, each of which also has an intensity profile similar to the profile out of the aperture. Because the expanded beam profile is a result of diffraction, the beam envelope 79 is sometimes called a diffraction envelope. The beamlets 32 are introduced within this diffraction envelope from the interference of diffraction envelopes from neighboring pixels.

The expanded-beam projection assembly 54 projects the expanded beam 78 onto the wind screen 42, which directs the expanded beam into the viewing space 30.

The wind screen 42 and the optical components of the beam-projection assembly 54 together transform the sinc-like intensity profiles of the beam 60 and the beam envelope 78 into the respective spatial Fourier Transforms, in both phase and amplitude, of these sinc-like intensity profiles in the viewing space 30. Because the spatial Fourier Transform of a sinc function is a top-hat profile, the beam envelope 79 has, in the viewing space 30, a substantially uniform intensity profile and the hexagonal aperture shown in FIG. 2. As discussed above in conjunction with FIG. 2, the beam envelope 79 defines the x-y dimensions of the viewing space 30, and thus has the same aperture as the cross section 34 of the viewing space. Moreover, as discussed further below in conjunction with FIG. 8, the hexagonal aperture of the beam envelope 79 depends only on the structure of the exit-pupil expander 52, and is, therefore, independent of the aperture of the beam 60. In addition, because the spatial Fourier Transform of the beamlet sinc functions is a top-hat profile with a hexagonal aperture, each beamlet 32 (FIG. 2) has a substantially uniform intensity profile and an aperture having substantially the same hexagonal shape as the aperture of the beam 60 does.

Furthermore, an operator (not shown in FIG. 3) may rotate the reflector 58 about an axis 82, which is normal to the page of FIG. 3, to adjust the position of the viewing space 30 in the vertical (y) dimension.

Still referring to FIG. 3, alternate embodiments of the heads-up display 40 are contemplated. For example, the display 40 may generate a monochrome image instead of a color image, and thus two of the three beam sources 64, 66, and 68 may be omitted from the beam generator 44, and the beam-combining function may be omitted from the assembly 76. Furthermore, the telecentric lens 50 may be omitted from the scanned-beam conditioning assembly 48 as discussed further below in conjunction with FIGS. 13 and 17. Moreover, although described as generating a virtual image for viewing by an operator of a vehicle, the display 40 may be constructed and disposed for generating an image for viewing by another occupant of the vehicle. For example, the display 40 may play a movie for one or more passengers. The display 40 may reflect the movie off of a portion of the wind screen 42 remote from the operator, or from a surface within the vehicle other than the wind screen, and this surface may be transparent, opaque, or partially transparent. Because such a movie comprises a stream of virtual images, a passenger watching the movie is less likely to experience motion sickness than if he were watching the movie on a conventional movie player. In addition, the display 40 may be used in systems other than a vehicle. Furthermore, the telecentric lens 50, the exit-pupil expander 52, and a negative power lens (not shown) at the output of the expander for further expanding the beam 78 may be integrated into a single unit. Moreover, one may replace the telecentric lens 50 with a graded-index-of-refraction (GRIN) lens, which can be integrated with the exit-pupil expander 52 into a single unit. In addition, the aperture of the beam envelope 79 may be annular such that the beam envelope has a "hole" in it. Furthermore, the display 40 may generate other types of images, such as a map or a telephone directory.

Figure 4:
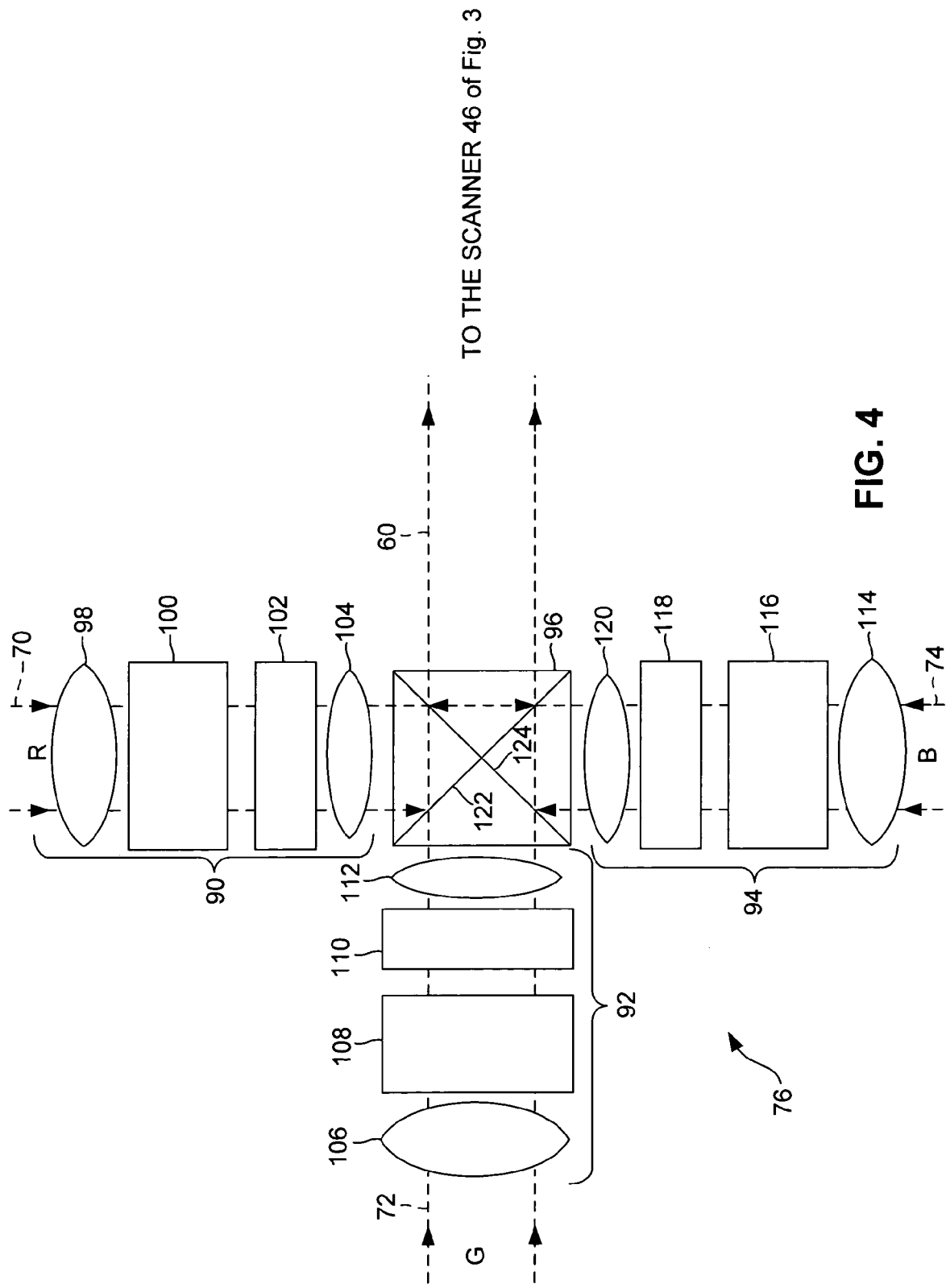
FIG. 4 is a diagram of a three color beam generator of FIG. 3 according to an embodiment of the invention.

FIG. 4 is a diagram of the beam-combining-and-conditioning assembly 76 of FIG. 3 according to an embodiment of the invention.

The assembly 76 includes three optical trains 90, 92, and 94, each for conditioning a respective one of the R beam 70, the G beam 72, and the B beam 74, and also includes a conventional beam-combining X cube 96, which combines the conditioned beams from the three optical trains into the output beam 60.

The optical train 90 includes a collimating lens 98, a top-hat converter 100, a hexagonal clipping aperture 102, and an optional focusing lens 104, which are all designed for the wavelength of the R beam 70. In one example, the wavelength of the R beam 70 is between 635 and 660 nanometers (nm).

Similarly, the optical train 92 includes a collimating lens 106, a top-hat converter 108, a hexagonal clipping aperture 110, and an optional focusing lens 112, which are all designed for the wavelength of the G beam 72, and the optical train 94 includes a collimating lens 114, a top-hat converter 116, a hexagonal clipping aperture 118, and an optional focusing lens 120, which are all designed for the wavelength of the B beam 74. In one example, the wavelengths of the G beam 72 and the B beam 74 are between 440 and 490 nm and between 500 and 550 nm, respectively.

The X-cube 96 includes a first inner surface 122, which is treated with an optical coating that passes the conditioned G and B beams but that reflects the conditioned R beam, and includes a second inner surface 124, which is treated with an optical coating that passes the conditioned R and G beams but that reflects the conditioned B beam.

The operation of the beam-combining-and-conditioning assembly 76 according to an embodiment of the invention is discussed below in conjunction with FIGS. 4 and 5. But first, FIG. 5 is discussed.

Figure 5:
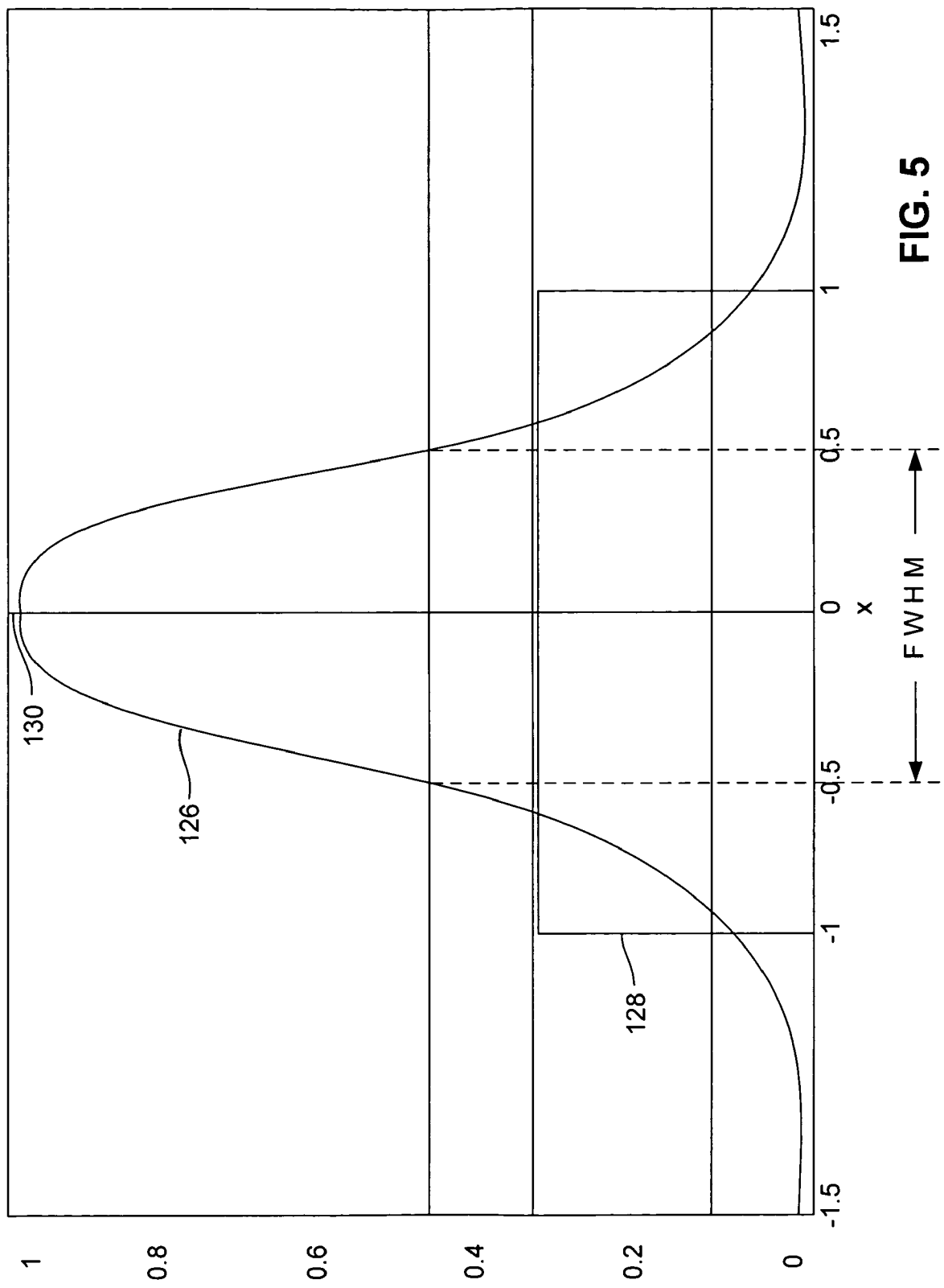
FIG. 5 is a plot of the Gaussian intensity profile of the beams within the beam generator of FIG. 4 laid over a plot of the top-hat (uniform) intensity profile of the scan beam generated by the beam generator of FIG. 4 according to an embodiment of the invention.

FIG. 5 is a plot of a Gaussian intensity profile 126 of an input beam, such as one of the beams 70, 72, and 74 of FIG. 4, laid over a plot of a top-hat intensity profile 128 of an output beam, which is generated by passing the input beam through a top-hat converter, such as one of the converters 100, 108, and 116 of FIG. 4, according to an embodiment of the invention. Although this plot is two dimensional, because the input and output beams are symmetrical, the plot represents any "slice" of these beams that is coplanar with the beams' center axis 130. That is, one can form a three-dimensional plot of the input and output beams' intensity profiles by spinning this two-dimensional plot about the beams' center axis 130.

The input beam (the beam having the intensity profile 126) has a maximum relative intensity of approximately 1 at its center axis 130, and the intensity tails off symmetrically according to a Gaussian function as one moves away from the center axis. Theoretically, a Gaussian function approaches, but never equals, zero; consequently, the input beam theoretically has an infinite aperture. Therefore, to aid discussion, one defines the full-width at half maximum (FWHM) of the beam as the width of the beam at the point where it has ½ of its maximum intensity. In this example, at the point where the input beam has an intensity=½×1=50%, it has a relative width of 1; therefore, the input beam has a relative FWHM of 1.

In contrast, the output beam (the beam having the intensity profile 128) has a uniform (flat) intensity of approximately 35% across virtually its entire width of approximately 2 times the FWHM width of the input Gaussian. Consequently, the top-hat converter through which the input beam having the Gaussian intensity profile 126 propagates redistributes the intensity of the input beam to form an output beam having the top-hat intensity profile 128. Of course, one can adjust the dimensions and other properties of the top-hat converter to vary the width and intensity of the output beam. Thus, in general, for an input beam having a Gaussian intensity profile, the smaller the width of the top-hat output beam, the higher the intensity of the output beam, and vice versa.

Referring again to FIG. 4, the operation of the beam-combining-and-conditioning assembly 76 is discussed where each of the beams 70, 72, and 74 has a Gaussian intensity profile such as the Gaussian intensity profile 126 of FIG. 5. Furthermore, for clarity, only the operation of the optical train 90 is discussed in detail, it being understood that the optical trains 92 and 94 operate in a similar manner.

First, the collimating lens 98 collimates the aperture of the R beam 70.

Next, the top-hat converter 100 converts the collimated R beam 70 having a Gaussian intensity profile (FIG. 5) into an R beam having a top-hat intensity profile (FIG. 5) in a conventional manner.

Then, the aperture 102 clips the beam output from the top-hat converter 100 to impart a hexagonal aperture to the beam, the hexagonal aperture being approximately the same shape as the aperture of the beamlets 32 of FIG. 2.

Next, the focusing lens 104 passes the R beam 70 from the aperture 102 to the X-cube surface 122, which reflects the beam to form the R component of the output beam 60. One function of the focusing lens 104 is to condition the R component of the output beam 60 such that at the input plane (not shown in FIG. 4) of the exit-pupil expander 52 (FIG. 3), the intensity profile of the output beam is the spatial Fourier Transform, in both phase and amplitude, of the intensity profile of the output beam as it exits the X cube 96. Consequently, the focusing lens 104 (and the focusing lens 112 and 120) may be omitted where other techniques are used to obtain this Fourier Transform relationship. For example, the focusing lens 104 (and the focusing lens 112 and 120) may be omitted when the telecentric lens 50 is omitted from the scanned-beam conditioning assembly 48 (FIG. 3).

The optical trains 92 and 94 each operate in a similar manner on the G and B beams, respectively, and the X-cube 96 passes the G beam and the surface 124 reflects the B beam to form the color output beam 60 by "overlapping" the reflected R and B beams and the passed G beam. The output beam 60 has a top-hat intensity profile with an intensity level substantially equal to the sum of the intensities of the R, G, and B beams, and has substantially the same hexagonal aperture as each of the R, G, and B beams.

Figure 6:
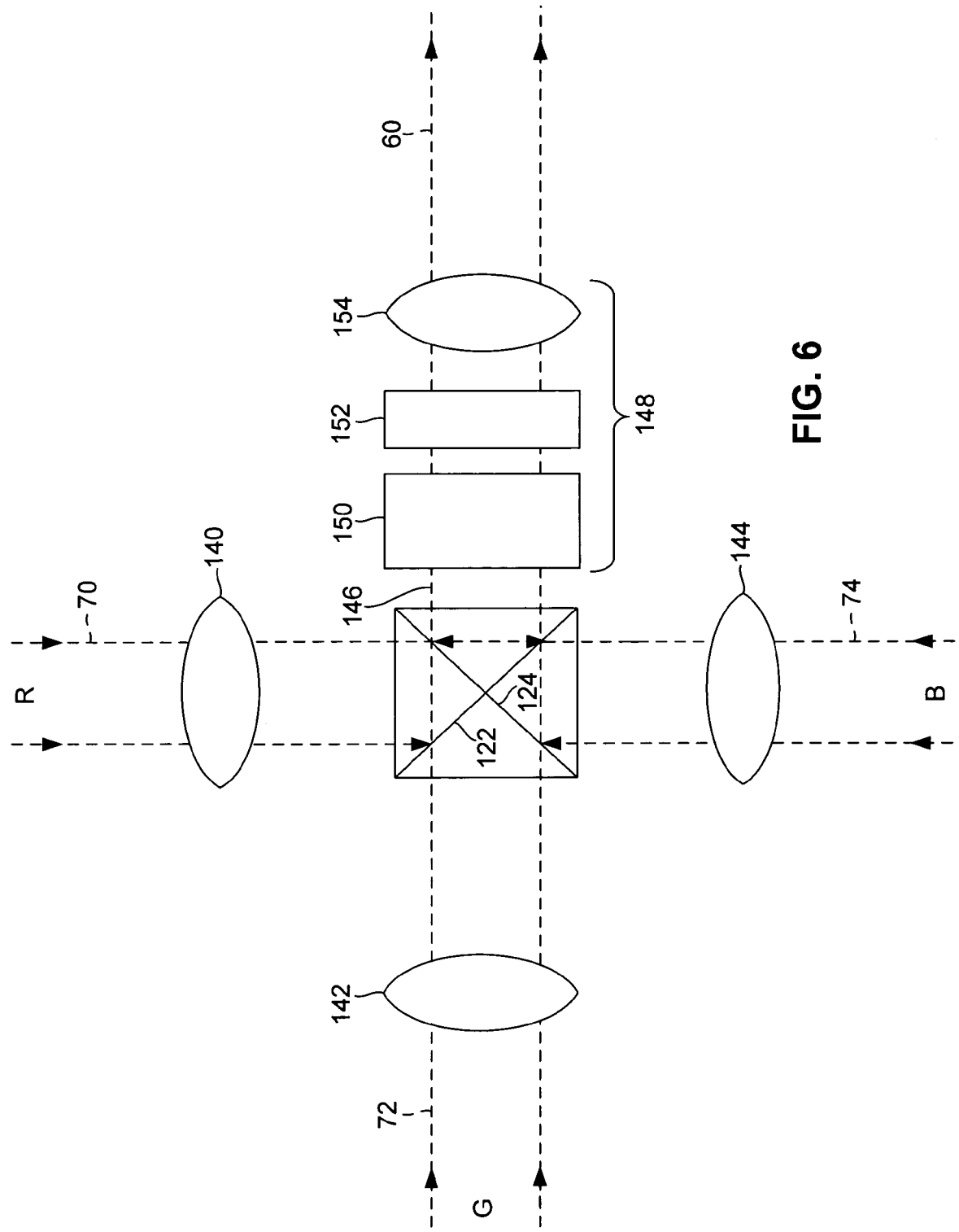
FIG. 6 is a diagram of a three color beam generator of FIG. 3 according to another embodiment of the invention.

FIG. 6 is a diagram of the beam-combining-and-conditioning assembly 76 according to another embodiment of the invention. One difference between the assemblies 76 of FIGS. 4 and 6 is that the assembly of FIG. 6 includes a reduced number of components, and thus may be smaller, easier to manufacture, and less expensive than the assembly of FIG. 4.

The assembly 76 includes three collimating lens 140, 142, and 144, each for collimating a respective one of the R beam 70, the G beam 72, and the B beam 74, the beam-combining X cube 96, which combines the collimated beams from the three optical trains into an intermediate beam 146, and an optical train 148, which converts the intermediate beam into the output beam 60.

The optical train 148 includes an achromatic (i.e., multi-wavelength) top-hat converter 150, an achromatic hexagonal aperture 152, and an optional achromatic focusing lens 154, which are designed for the wavelengths of the R, G, and B beams 70, 72, and 74 in a conventional manner. In one example, the R, G, and B beams have the same respective wavelengths as discussed above in conjunction with FIG. 4.

Still referring to FIG. 6, the operation of the beam-combining-and-conditioning assembly 76 is discussed according to an embodiment of the invention where each of the input R, G, and B beams 70, 72, and 74 has substantially the same Gaussian intensity profile such as the profile 126 of FIG. 5.

First, the collimating lenses 140, 142, and 144 respectively collimate the R, G, and B beams 70, 72, and 74.

Next, the X-cube 96 passes the G beam, and the surfaces 122 and 124 respectively reflect the R and B beams such that the reflected R and B beams "overlap" the G beam to form the color intermediate beam 146 having substantially the same Gaussian intensity profile as the input R, G, and B beams 70, 72, and 74.

Then, the top-hat converter 150 conventionally converts the intermediate beam 146 into a beam having a top-hat intensity profile such as the profile 128 of FIG. 5.

Next, the aperture 152 clips the beam from the top-hat converter 150 to impart a hexagonal aperture to the beam, the hexagonal aperture being approximately the same shape as the apertures of the beamlets 32 (FIG. 2).

Then, the focusing lens 154 receives the beam from the aperture 152 and generates the output beam 60, which has the top-hat intensity profile and the hexagonal aperture. For reasons similar to those discussed above in conjunction with FIGS. 4 and 5, the focusing lens 154 may be omitted.

Referring again to FIGS. 4-6, alternate embodiments of the beam-combining-and-conditioning assembly 76 are contemplated. For example, although shown as respective single optical components, one or more of the top-hat converters 100, 108, 116, and 150 may each include multiple optical components. Furthermore, one can replace the X-cube 96 with a slab beam combiner such as the one disclosed in U.S. patent application Ser. No. 10/828,876, filed Apr. 23, 2004, and which is incorporated by reference. In addition, one can omit one or more of the top-hat converters and design the one or more of the corresponding clipping apertures 102, 110, 118, and 152 to have a clipping width equal or approximately equal to the FWHM width of the corresponding R, G, or B beams and the intermediate beam 146. For example, where a beam has the Gaussian intensity profile 126 (FIG. 5) this clipping technique will impart to the beam 60 the top portion of the profile 126, i.e., the profile 126 with the all portions of the beam blocked beyond a relative width of +/−0.5 from the center axis 130. This to portion of the Gaussian profile 126 roughly approximates a top-hat profile. But although such an embodiment reduces the number of optical components in the assembly 76, it is less efficient because it discards more beam energy than embodiments, such as the embodiments of FIGS. 4 and 6, which use a top-hat converter. Furthermore, because this embodiment does not impart a true top-hat intensity profile to the output beam 60, the beamlets 32 (FIG. 2), and thus the expanded beam 78, may have a non-uniform intensity profile within the viewing space 30.

Figure 7:
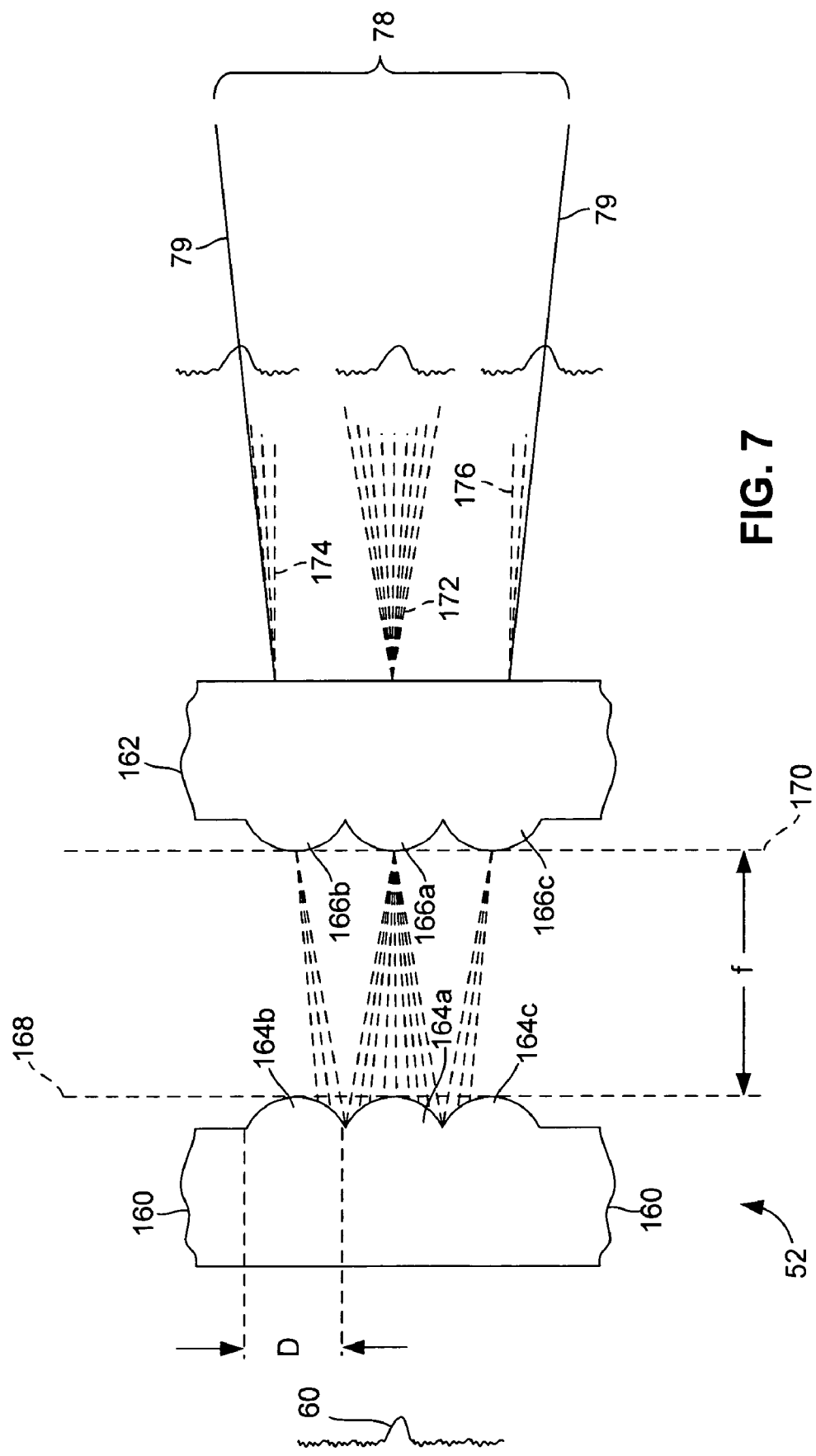
FIG. 7 is a side view of the exit-pupil expander of FIG. 3 according to an embodiment of the invention.

FIG. 7 is a side view of the exit-pupil expander 52 of FIG. 3 according to an embodiment of the invention. In this embodiment, the expander 52 is a dual-microlens array (DMLA), the structure and operation of which are thoroughly discussed in "A Novel Approach for Exit Pupil Expansion in Wearable Displays", Karlton Powell, et al., "Exit Pupil Expander: Image Quality Performance Enhancements and Environmental Testing Results", Karlton Powell, et al., U.S. provisional application Ser. No. 60/541,619 filed on Feb. 4, 2004, which are incorporated by reference. Therefore, for brevity, only an overview of the DMLA is presented below.

The DMLA exit-pupil expander 52 includes first and second microlens arrays (MLAs) 160 and 162, which are made from a transparent optical material such as plastic or glass and which include a number of lenslets 164 and 166, respectively. The MLA 160 has focal plane 168 and a focal length f from the focal plane; likewise, the MLA 162 has a focal plane 170, and the same focal length f from the focal plane 170. The MLAs 160 and 162 are positioned such that their focal planes 168 and 170 are separated by the focal length f, and the gap between the MLAs is filled with air. Each lenslet 164 and 166 has a width D, which is the pitch of the MLAs 160 and 162, and each lenslet 164 is aligned with a corresponding lenslet 166.

Figure 8:
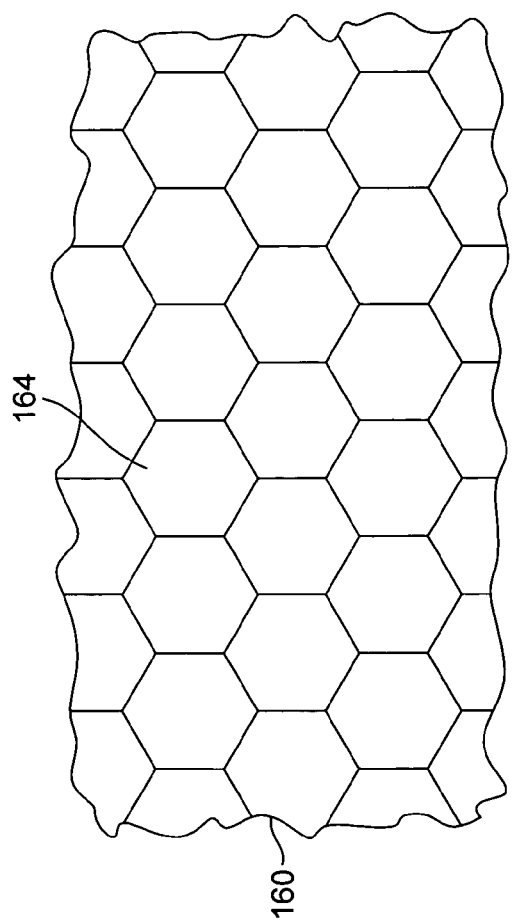
FIG. 8 is a plan view of a hexagonally arranged microlens array of FIG. 7 according to an embodiment of the invention.

FIG. 8 is a plan view of the MLA 160 of FIG. 7 according to an embodiment of the invention, it being understood that the MLA 162 is similar. The lenslets 164 have a hexagonal footprint, are arranged in a "honeycomb" pattern, and are contiguous such that there are no spaces between adjacent lenslets where the lenslets join the backplane of the MLA 160.

The operation of the DMLA exit-pupil expander 52 is discussed in conjunction with FIGS. 7-8 according to an embodiment of the invention where the width of the scanned beam 60 as it exits the beam generator 44 (FIG. 3) is approximately D, the footprint of each of the lenslets 164 and 166 has the same hexagonal shape as the output beam's aperture, and the output beam's aperture has the same orientation as the footprints of the lenslets.

As discussed above in conjunction with FIG. 3, the scanned-beam conditioning assembly 48 causes the intensity profile of the scanned beam 60 to be sinc-like at the input of the DMLA exit-pupil expander 52.

When the beam 60 is centered on a lenslet 164a, the corresponding lenslet 166a outputs an expanded center beam 172 also having a sinc-like intensity profile.

As discussed above in conjunction with FIG. 3, the expanded-beam projection assembly 54 performs a spatial Fourier Transform in phase and amplitude on the expanded center beam 172 within the viewing space 30.

Consequently, ignoring side beams (discussed below) for the moment, in the viewing space 30 the center beam 172 is bounded by the hexagonal beam envelope 79 and has a uniform intensity profile and no beamlets 32. That is, the envelope 79 effectively bounds a single beamlet, the center beam 172, which has a top-hat intensity profile within the viewing space 30 (FIG. 2). Furthermore, the hexagonal aperture of the beam envelope 79 and the center beam 172 is due to the honeycomb layout of the MLAs 160 (FIG. 8) and 162 and the hexagonal aperture of the lenslets 164 and 166, but is independent from the aperture of the beam 60. That is, the beam envelope 79 and the center beam 172 would still have a hexagonal aperture even if the aperture of the beam 60 was other than hexagonal. Moreover, because the center beam 172 is generated by refraction, the beam envelope 79 is independent of wavelength. That is, the beam envelope 79 has the same aperture regardless of the wavelength or wavelengths of light that compose the scanned beam 60.

But because the intensity profile of the beam 60 is sinc-like at the input of the DMLA exit-pupil expander 52 (also the case for Gaussian or truncated Gaussian beams), some of the beam energy is incident on the adjacent lenslets 164b and 164c, thus causing the corresponding lenslets 166b and 166c to output side beams 174 and 176—because FIG. 7 is a two-dimensional side view, other side beams outside of the plane of FIG. 7 may exist. Furthermore, even if none of the beam energy is incident on the adjacent lenslets 164b and 164c when the beam 60 is centered on the lenslet 164a, the beam 60 still overlaps multiple lenslets as the scanner 46 (FIG. 3) sweeps the beam from one lenslet to another, and this overlapping gives rise to output side beams 174 and 176.

Still referring to FIGS. 7-8, the side beams 174 and 176 interfere with the expanded center beam 172 in the far field, and this diffraction phenomenon yields the expanded beam 78 having the beamlets 32, which are sometimes called diffraction orders. As discussed above in conjunction with FIG. 3, the hexagonal aperture and top-hat intensity profile of the beamlets 32 within the viewing space 30 are the same as the aperture and the intensity profile of the output beam 60 as it exits the beam generator 44; but the aperture and intensity profile of the beamlets are independent of the layout pattern and aperture of the lenslets 164 and 166. Furthermore, because the beamlets 32 are generated by interference of overlapping diffraction envelopes, the size of the beamlet aperture is dependent on wavelength. Consequently, one may design the DMLA exit-pupil expander 52 for the center wavelength, for example the wavelength of the G component, of the scanned beam 60.

In summary, the intensity profile of the beam envelope 79 depends only on the optical properties of the DMLA exit-pupil expander 52, the aperture of the beam envelope 79 depends only on the layout pattern and aperture of the lenslets 164 and 166, the intensity profile of the beamlets 32 depends only on the intensity profile of the scanned beam 60, and the aperture of the beamlets depends only on the aperture of the scanned beam.

Still referring to FIGS. 7 and 8, alternate embodiments of the exit-pupil expander 52 are contemplated. For example, the gap between the MLAs 160 and 162 may be filled with a transmission medium other than air. For example, the fill medium may be a solid to resist gap compression or expansion that may alter the optical properties of the DMLA expander 52, and one can alter the properties (e.g., pitch, lenslet curvature, index of refraction) of the MLAs 160 and 162 in a conventional manner to compensate for the different index of refraction (relative to the index of refraction of air) of the filler medium. Additional embodiments are discussed below in conjunction with FIGS. 13-18.

FIGS. 9A-11B illustrate the dependence of the intensity profile of the expanded beam 78 (FIGS. 3 and 7) within the viewing space 30 on the intensity profiles of the beam envelope 79 (FIGS. 2 and 7) and the beamlets 32 (FIG. 2), and artifacts caused by the expanded beam having a non-uniform intensity profile. As discussed below, artifacts such as "banding" may be more severe when an operator's eye is outside of the cross section 34 of the viewing space 30.

FIG. 9A shows the beam envelope 79 having a uniform (flat) intensity profile, and FIG. 9B shows that the beamlets 32, which each have a non-uniform, Gaussian-like intensity profile, combine to yield a non-uniform beamlet intensity profile within the beam envelope 79.

FIG. 9C shows the non-uniform intensity profile of the expanded beam 78 within the viewing space 30 resulting from the beam-envelope and combined-beamlet intensity profiles of FIGS. 9A and 9B. Each sinc-like beam output 172, 174, and 176 at the exit-pupil expander 52 transforms into a top-hat intensity profile in the far field. Interference due to overlap of these beam outputs 172, 174, and 176 forms beamlets 32 at a spacing defined by the lenslet array pitch and layout. The envelope of the input beam 60 in phase and amplitude transforms to form the intensity profile of each beamlet 32 in the far-field within the expanded beam 78. Thus it can be considered that the resulting intensity profile of the expanded beam 78 is a convolution, in phase and amplitude of the expanded beam-envelope of FIG. 9A, the beamlet envelope, and the beamlet spacing and layout of FIG. 9B. Consequently, even though the beam-envelope intensity profile (FIG. 9A) is uniform, the non-uniformity of the combined-beamlet intensity profile (FIG. 9B) causes the intensity profile of the expanded beam 78 to be non-uniform. And although not shown, a uniform combined-beamlet intensity profile combined with a non-uniform beam-envelope intensity profile also yields a non-uniform resulting intensity profile.

Figure 10B:
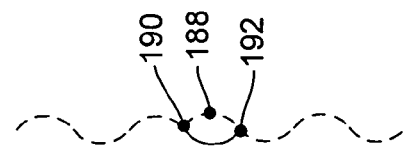
FIGS. 10A and 10B illustrate intensity non-uniformities within the viewing space of FIG. 2 caused by the resulting beam intensity profile of FIG. 9C according to an embodiment of the invention.
Figure 10A:
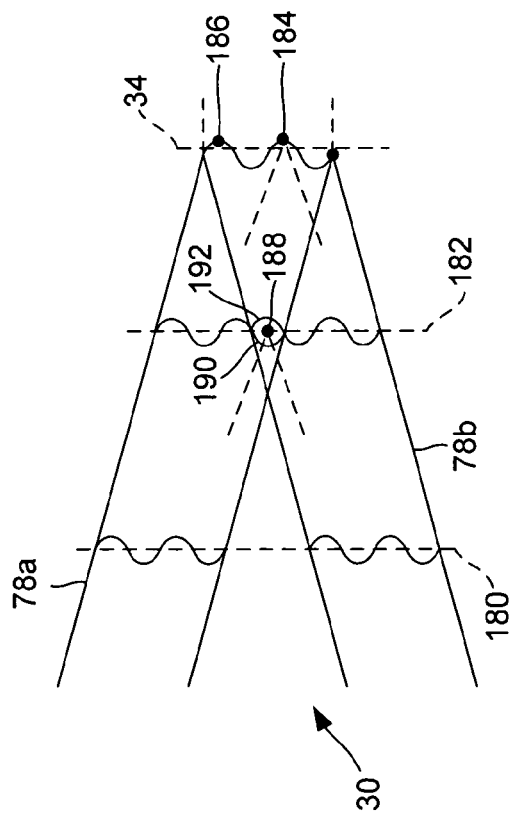

FIGS. 10A and 10B illustrate intensity patterns perceived by an operator (not shown in FIGS. 10A and 10B) for different eye positions within the viewing space 30 for a non-uniform expanded-beam intensity profile similar to that of FIG. 9C. And discussed below are artifacts that can arise when the expanded-beam intensity profile is not uniform throughout the viewing space.

FIG. 10A illustrates a first expanded beam 78a that generates a first pixel at the top of a virtual image, and a second expanded beam 78b that generates a second pixel at the bottom of the image, each expanded beam having the same non-uniform intensity profile. Although the first and second pixels, and thus the first and second expanded beams 78a and 78b, are generated at different times, both are shown in FIG. 10A for purposes of illustration. Furthermore, other expanded beams are generated between the expanded beams 78a and 78b to generate corresponding pixels between the first and second pixels, but these other expanded beams are omitted for clarity.

For a single expanded beam 78, any cross section within the viewing space 30 has the expanded beam's intensity profile. For example, at the cross sections 180 and 182, the same non-uniform intensity profile exists within each expanded beam 78a and 78b.

At the cross section 34 of the viewing space 30, the expanded beams 78a and 78b overlap at all points such that at each point along the cross section 34, the expanded-beam intensity profile has the same level for each pixel. For example, at a location 184 or 186, the intensity-profile level is respectively the same for each expanded beam 78, and is thus the same for each pixel of the image.

But at locations outside of the cross section 34, the expanded beams 78a and 78b do not overlap at all points, and thus the intensity-profile level may change from pixel to pixel. For example, at a location 188 (FIG. 10B), the intensity-profile level changes from pixel to pixel as further explained below.

Therefore, if an operator's eye pupil (not shown in FIGS. 10A and 10B) is aligned with the cross section 34, then the operator typically perceives a uniform image intensity if he does not move his eye, but may perceive a non-uniform intensity if and while he moves his eye from one location of the cross section 34 to another location of the cross section 34. For example, assume that the eye pupil is at the location 184. Because at the location 184 the level of the expanded-beam intensity profile is the same for each pixel, the operator perceives a uniform intensity profile for the image as long as he does not move his eye from the location 184. That is, although the absolute intensity at different locations of the image may change with the image content, the operator does not perceive "banding," where one region of the image has a higher average brightness than another region. But if the operator moves his eye from the location 184 to the location 186, then he may notice that the image brightness changes while his eye effectively traverses the portion of the non-uniform expanded-beam intensity profile between the locations 184 and 186.

But if the operator's eye (not shown in FIGS. 10A and 10B) is outside of the cross section 34, then he may perceive the image having a non-uniform intensity profile even if he does not move his eye. For example, assume that the eye pupil is at the location 188. Because at the location 188 the expanded beams 78a and 78b do not overlap at all points, the level of the expanded-beam intensity profile is different for each pixel. For the pixel carried by the expanded beam 78a, the operator perceives the intensity-profile end at a point 190 on the expanded-beam intensity profile, and for the pixel carried by the beam 78b, the operator perceives the intensity-profile level at a point 192 on the expanded-beam intensity profile. That is, as the scanner 46 (FIG. 3) sweeps the beam 60 (FIG. 3), the expanded beam 78 effectively "pivots" from the position of the beam 78a to the position of the beam 78b. During this "pivoting," the portion of the expanded-beam intensity profile between the points 190 and 192 effectively moves past the location 188, and thus past the operator's eye. Therefore, even without moving his eye, the operator perceives the image as having an intensity profile equal to the portion of expanded-beam intensity profile between the points 190 and 192. Because this portion of the expanded-beam intensity profile is not uniform, the operator may, depending on the magnitude of the non-uniformity, perceive intensity "banding" even when he is not moving his eye, and may perceive shifting of the "banding" pattern as he moves his eye in any direction. Of course, this "banding" pattern may disappear if the operator moves his eye into alignment with a location of the cross section 34 of the viewing space 30.

FIGS. 11A-12B illustrate how the heads-up display 40 reduces the severity of, or altogether eliminates, the artifacts discussed above in conjunction of FIGS. 10A and 10B according to an embodiment of the invention. Specifically, the display 40 generates the expanded beam 78 having a uniform intensity profile as discussed above in conjunction with FIGS. 4-8.

FIG. 9A shows expanded-beam envelope 78 having a uniform intensity profile as discussed above, and FIG. 11A shows that the beamlets 32 also each having a uniform intensity profile.

FIG. 11B shows the uniform intensity profile of the expanded beam 78 resulting from the uniform beam-envelope and combined-beamlet intensity profiles of FIGS. 9A and 11B. Specifically, the expanded-beam intensity profile is the combination of the beam-envelope intensity profile of FIG. 9A with the combined-beamlet intensity profile of FIG. 11B. That is, the convolution of uniform beam-envelope and combined-beamlet intensity profiles yields a uniform expanded-beam intensity profile.

Figure 12:
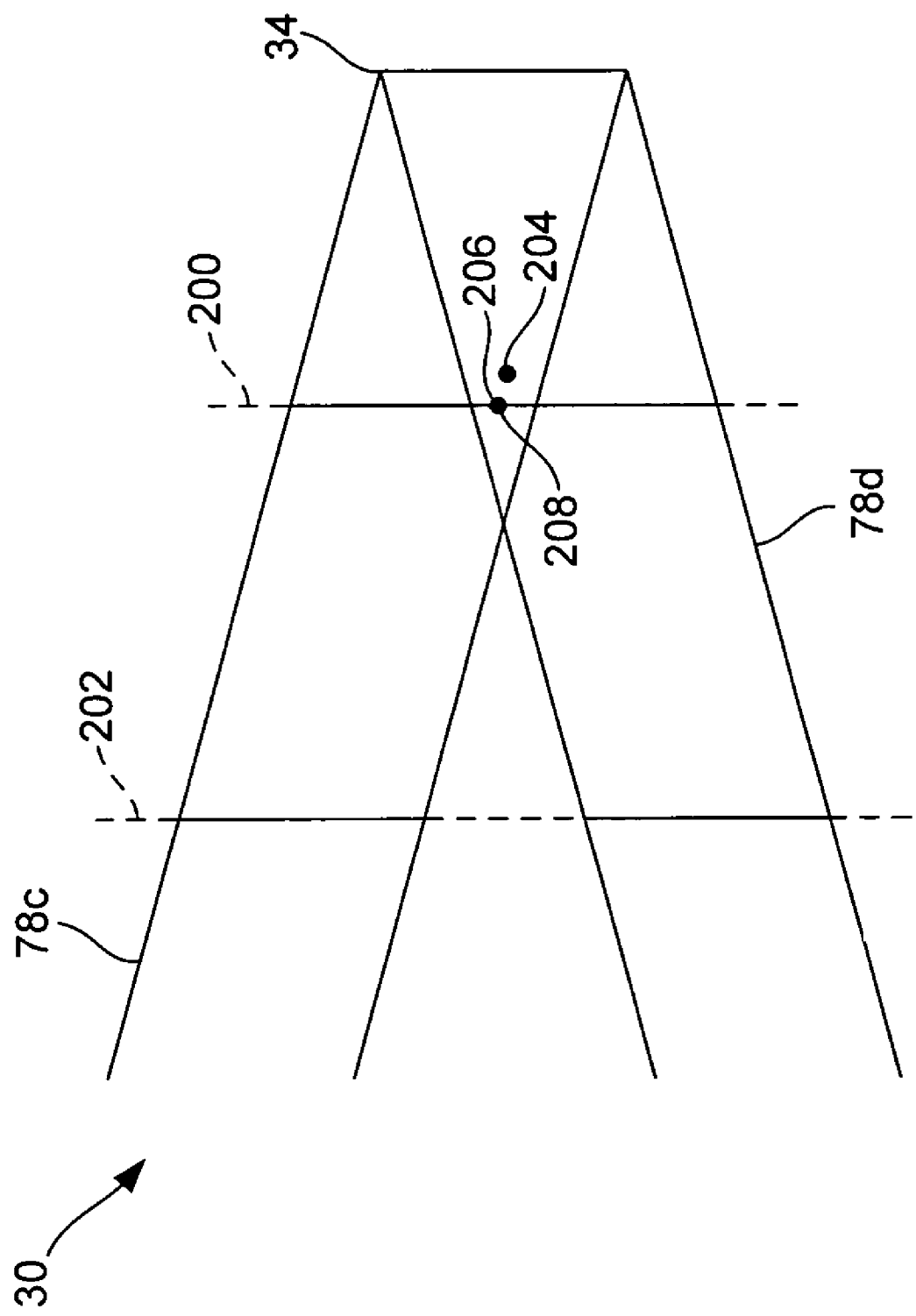
FIG. 12 illustrates a simplified or ideal intensity uniformity within the viewing-space of FIG. 2 caused by the uniform beam intensity profile of FIG. 11B according to an embodiment of the invention.

FIG. 12 illustrates intensity patterns perceived by an operator (now shown in FIG. 12) for different eye positions within the viewing space 30 for the uniform expanded-beam intensity profile of FIG. 11B according to an embodiment of the invention.

More specifically, FIG. 12 illustrates a first expanded beam 78c that generates a first pixel at the top of the virtual image, and illustrates a second expanded beam 78*d* that generates a second pixel at the bottom of the image.

For a single expanded beam 78, any cross section within the viewing space 30 has the expanded-beam intensity profile of FIG. 11B. For example, at the cross sections 200 and 202, the same uniform expanded-beam intensity profile exists within each expanded beam 78*c* and 78*d*.

At the cross section 34 of the viewing space 30, the expanded beams 78*c* and 78*d* overlap at all points such that at any point along the cross section 34, the expanded-beam intensity profile is the same for each pixel. Therefore, an operator (not shown in FIG. 12) will sense little or no change in the image brightness as he moves his eye from one location of the cross section 34 to another location of the cross section 34.

Furthermore, at locations outside of the cross section 34, even though the expanded beams 78*c* and 78*d* do not overlap at all points, the expanded-beam intensity-profile level is the same for each pixel within the image perceived by an operator. For example, at a location 204, the intensity-profile level does not change from pixel to pixel because the portion of the intensity profile between points 206 and 208 (same point in FIG. 12) is flat. That is, as the expanded beam 78 pivots from the position of the beam 78*c* to the position of the beam 78*d*, the level of the expanded-beam intensity profile does not change at the point 204. Therefore, the operator does not perceive "banding" in the image when his eye is outside of the cross section 34.

Consequently, an operator perceives a substantially uniform image intensity regardless of the location of his eye's pupil within the viewing space 30 and regardless of whether he is moving his eye. That is, because the expanded-beam intensity profile (FIG. 11B) is substantially flat, the operator perceives the image having substantially the same uniform intensity profile at any location within the viewing space 30.

Referring to FIGS. 11A-12, alternate embodiments of the invention are contemplated. For example, instead of generating the uniform expanded-beam intensity profile (FIG. 11B) by generating uniform intensity profiles for both the beam envelope 79 and the beamlets 32, the heads-up display 40 (FIG. 3) may generate the beam envelope 79 and the beamlets 32 having non-uniform intensity profiles such that the convolution of these non-uniform intensity profiles yields a uniform expanded-beam intensity profile such as shown in FIG. 11B.

Figure 13:
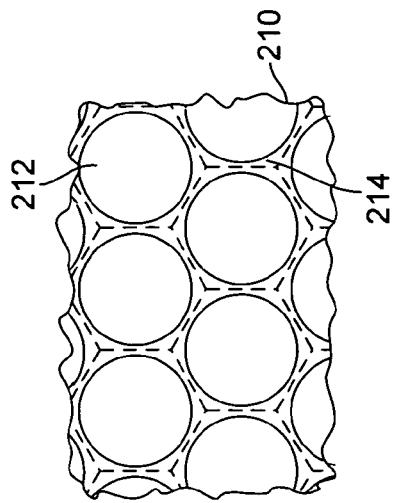
FIG. 13 is a plan view of one of the microlens arrays of FIG. 7 according to another embodiment of the invention.

FIG. 13 is a plan view of an MLA 210 belonging to a DMLA exit-pupil expander 52 (FIG. 3) according to another embodiment of the invention, it being understood that the alternative DMLA includes a second MLA that is similar to the MLA 210 but that is omitted from FIG. 13 for clarity. The MLA 210 differs from the MLA 160 of FIG. 8 in that lenslets 212 are not fully contiguous with one another at the MLA backplane, and thus the MLA 210 has spaces 214 between adjacent lenslets 212. The spaces 214 are often the result of a conventional manufacturing process that does not or cannot form fully contiguous lenslets 212. But by treating the spaces 214 with an opaque coating, the spaces have little or no adverse affect on the operation of the alternative DMLA. Consequently, when including a DMLA having the MLA 210 and a similar second MLA, the heads-up display 40 (FIG. 3) can generate the viewing space 30 (FIG. 2) having substantially the same properties (e.g., uniform expanded-beam intensity profile, hexagonal aperture) as discussed above in conjunction with FIGS. 3-12. In a related embodiment, the spaces 214 on only one of the MLAs, such as the MLA and the input side of the DMLA expander 52, are treated with an opaque coating.

Figure 14:
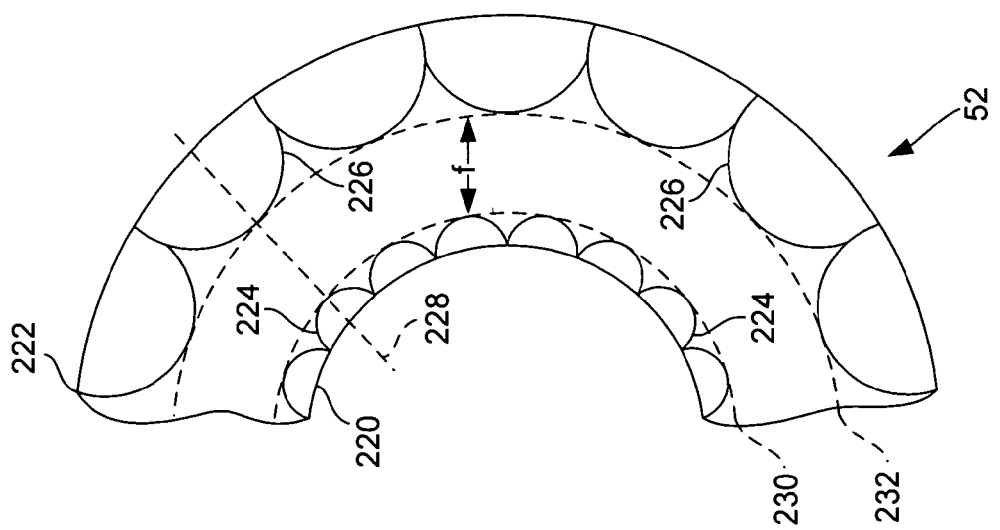
FIG. 14 is a side view of the exit-pupil expander of FIG. 3 according to another embodiment of the invention.

FIG. 14 is a side view of a DMLA exit-pupil expander 52 according to another embodiment of the invention. The DMLA of FIG. 14 differs from the DMLA of FIGS. 7-8 in that it includes curved MLAs 220 and 222, which respectively include lenslets 224 and 226. Corresponding pairs of lenslets 224 and 226 are aligned such that the scanned beam 60 (FIG. 3) follows radial paths 228 that are simultaneously coincident with the center axes of both lenslets of these respective lenslet pairs. Consequently, the curved DMLA allows one to omit the telecentric lens 50 from the scanned-beam conditioner assembly 48 (FIG. 3). The MLAs 220 and 222 each have the same focal length f in the radial dimension, and have respective focal curves 230 and 232, which are spaced apart by f in the radial dimension. Furthermore, the lenslets 224 and 226 are arranged in the honeycomb pattern of FIGS. 8 and 13, and the MLAs 220 and 222 may include opaquely coated spaces between the lenslets as discussed above in conjunction with FIG. 13. Consequently, when including the DMLA of FIG. 14, the heads-up display 40 (FIG. 3) can generate the viewing space 30 (FIG. 2) having substantially the same properties (e.g., uniform expanded-beam intensity profile, hexagonal aperture) as discussed above in conjunction with FIGS. 3-12.

Figure 15:
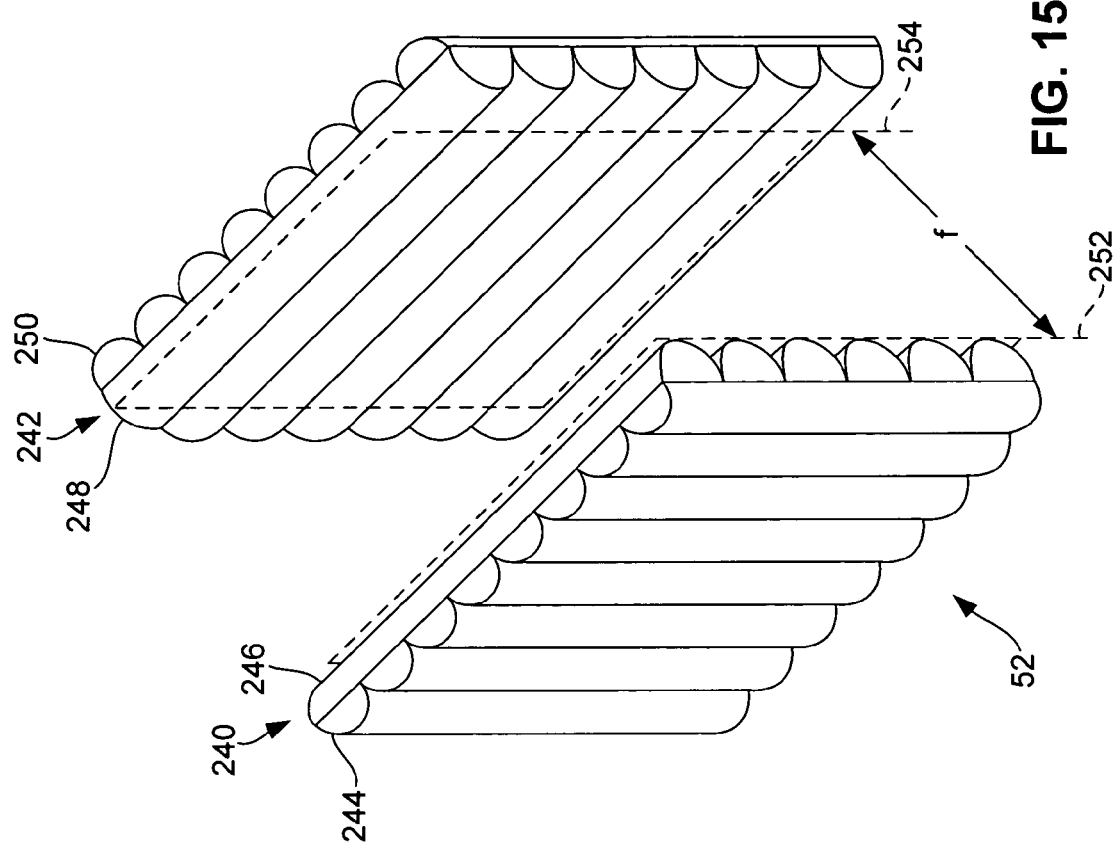
FIG. 15 is an isometric view of the exit-pupil expander of FIG. 3 according to another embodiment of the invention.

FIG. 15 is an isometric view of a slab DMLA exit-pupil expander 52 according to another embodiment of the invention. This DMLA includes two MLAs 240 and 242, which are each formed from a respective pair of slabs 244 and 246, and 248 and 250, of semi-cylindrical lenses each having the same pitch. The slab 244 is orthogonal to the slab 246, and the slab 248 is orthogonal to the slab 250. The MLAs 240 and 242 each have the same focal length f, and have respective focal planes 252 and 254, which are spaced apart by f. The resulting lenslets of each MLA 240 and 242 are effectively arranged in a square pattern, not a hexagonal pattern; consequently, the resulting lenslets cause the beam envelope 79 (FIG. 3) to have a square shape. Therefore, to improve the fill factor, one can modify the beam generator 44 (FIG. 3) to impart a square aperture to the output beam 60, and thus to the beamlets 32 (FIG. 2).

Still referring to FIG. 15, alternative embodiments of the slab DMLA exit-pupil expander 52 are contemplated. For example, one slab of each MLA 240 and 242 can have a different pitch than the other slab so that the resulting lenslets have a rectangular shape. To improve the fill factor for such an embodiment, one can modify the beam generator 44 (FIG. 3) to impart a rectangular aperture to the output beam 60, and thus to the beamlets 32 (FIG. 2). Furthermore, although shown with the horizontally aligned slabs 246 and 248 facing one another, one can contract the slab DMLA expander 52 with the two vertically aligned slabs 244 and 250 facing one and other, or one vertically aligned slab facing a horizontally aligned slab. Moreover, if there are any spaces between the lenses at the slab backplane, one can treat them with an opaque coating as discussed above in conjunction with FIG. 13.

Figure 16:
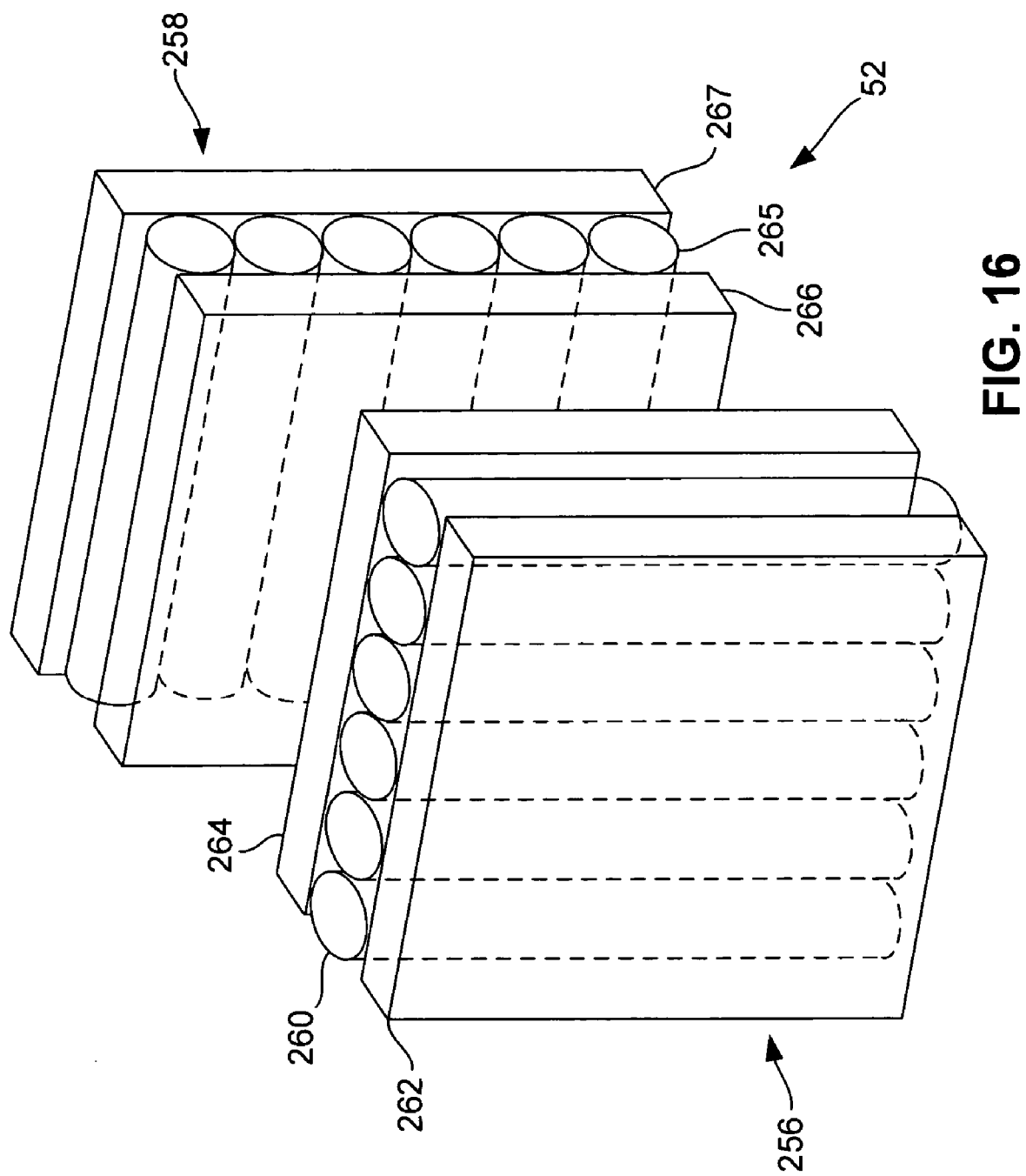
FIG. 16 is an isometric view of the exit-pupil expander of FIG. 3 according to another embodiment of the invention.

FIG. 16 is an isometric view of a DMLA exit-pupil expander 52 according to another embodiment of the invention. This DMLA expander 52 includes two lenslet arrays 256 and 258. The array 256 includes cylindrical lenses 260 having the same pitch and mounted between two slabs 262 and 264 of optical material such as glass or plastic. For example, the cylindrical lenses 260 may be optical fibers. The array 258 is similar to the array 256, and includes cylindrical lenses 265 having the same pitch and mounted between two slabs 266 and 267 of optical material such as glass or plastic such that the lenses 265 are orthogonal to the lenses 260. The resulting lenslets are arranged in a square pattern and cause the expanded-beam envelope 79 (FIG. 3) to have a square shape.

Therefore, one can modify the beam generator 44 (FIG. 3) to impart a square aperture to the output beam 60, and thus to the beamlets 32 (FIG. 2). Moreover, to mask spaces between the lenses 260 and 265, one can treat corresponding regions of the slabs 262, 264, 266, and 267 with an opaque coating as discussed above in conjunction with FIG. 13.

Figure 17:
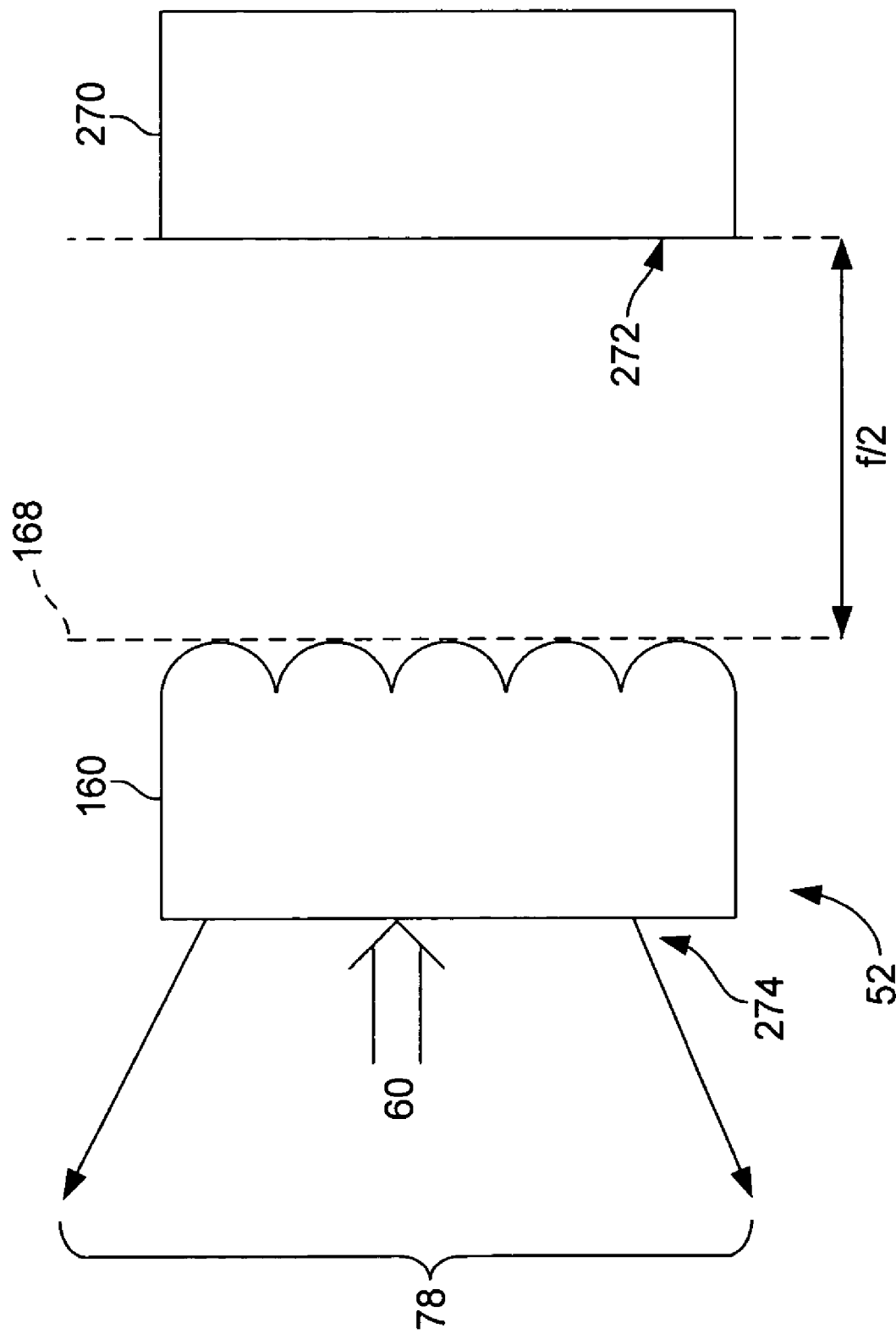
FIG. 17 is a side view of the exit-pupil expander of FIG. 3 according to another embodiment of the invention.

FIG. 17 is a side view of a reflective DMLA exit-pupil expander 52 according to another embodiment of the invention. Like the DMLA expander 52 of FIGS. 7-8, the reflective DMLA expander includes the MLA 160. But the reflective DMLA expander 52 differs from the DMLA expander of FIGS. 7-8 in that it includes a reflector 270 instead of the MLA 162. The reflector 270 includes a planar reflecting surface 272 that is located f/2 from the focal plane 168 of the MLA 160. Consequently, the expanded beam 78 propagates to the viewing space 30 (FIG. 2.) from a front side 274 (i.e., the same side into which the scanned beam 60 propagates) of the MLA 160. Therefore, when incorporating the reflective DMLA expander 52 of FIG. 17, the heads-up display 40 (FIG. 3) can generate the viewing space 30 (FIG. 2) having substantially the same properties (e.g., uniform expanded-beam intensity profile, hexagonal aperture) as discussed above in conjunction with FIGS. 3-12. Furthermore, the reflective DMLA expander 52 may be easier to manufacture than the DMLA expander 52 of FIGS. 7-8 because it does not require alignment of two MLAs.

Figure 18:
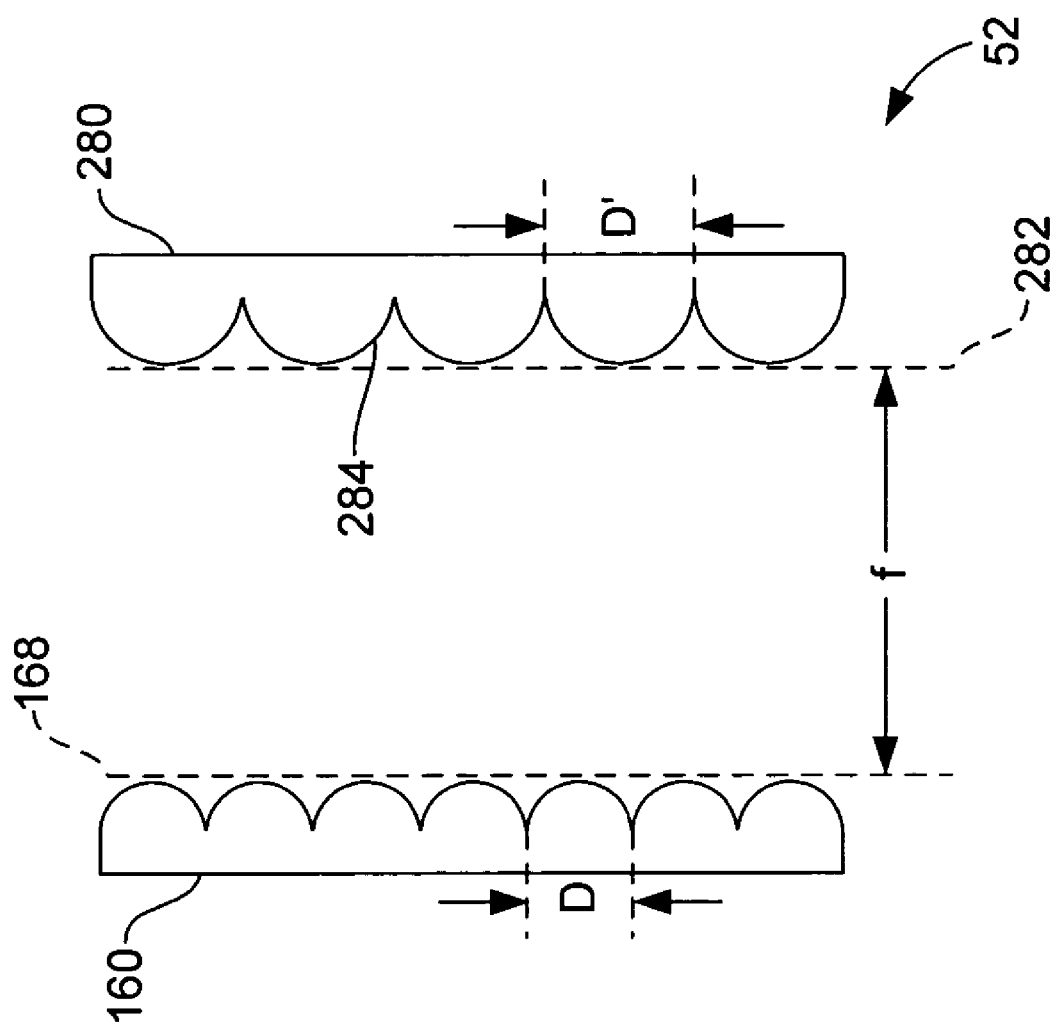
FIG. 18 is a side view of the exit-pupil expander of FIG. 3 according to another embodiment of the invention.

FIG. 18 is a side view of a multi-pitch DMLA exit-pupil expander 52 according to another embodiment of the invention. Like the DMLA expander 52 of FIGS. 7-8, the multi-pitch DMLA expander includes the MLA 160 having the lenslet pitch D. But the multi-pitch DMLA expander 52 differs from the DMLA expander of FIGS. 7-8 in that it includes a second MLA 280 having a different lenslet pitch D'>D, which allows one to omit the telecentric lens 50 from the scanned-beam conditioning assembly 48 (FIG. 3). The MLA 280 has a focal length f, a focal plane 282 that is located a distance f from the focal plane 168 of the MLA 160, and lenslets 284 that are arranged in a honeycomb pattern similar to the pattern of the MLA 160 as shown in FIG. 8. Consequently, when incorporating the multi-pitch DMLA expander 52, the heads-up display 40 (FIG. 3) can generate the viewing space 30 (FIG. 2) having substantially the same properties (e.g., uniform expanded-beam intensity profile, hexagonal aperture) as discussed above in conjunction with FIGS. 3-12. In an alternative embodiment of the multi-pitch DMLA expander 52, D' is less than D.

Figure 19:
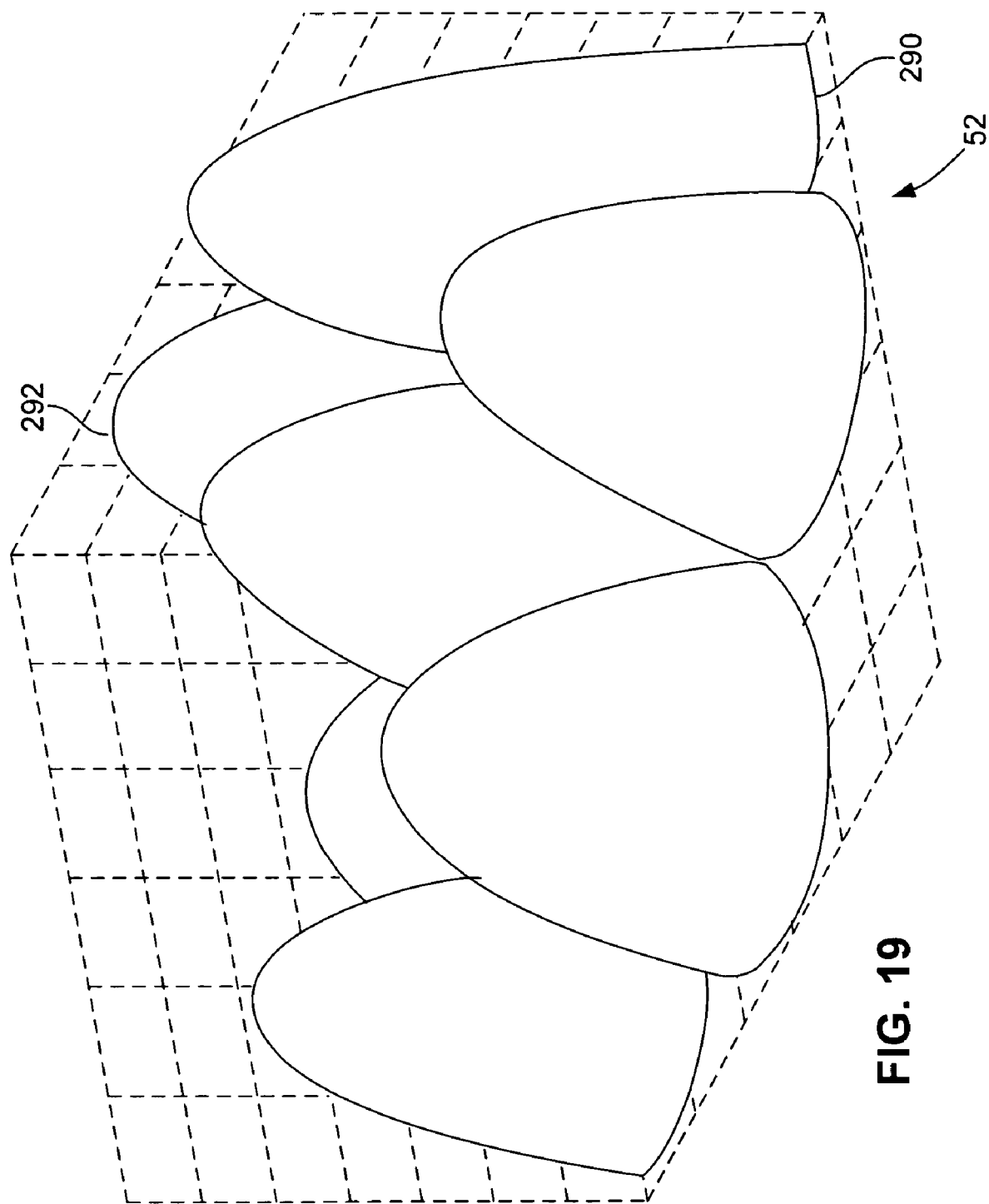
FIG. 19 is an isometric view of the surface topography of the exit-pupil expander of FIG. 3 according to another embodiment of the invention.

FIG. 19 is an isometric view of a single-microlens-array (SMLA) exit-pupil expander 52 according to another embodiment of the invention. As its name implies, the SMLA expander 52 includes a single MLA 290. Like the lenslets 164 of the MLA 160 (FIGS. 7 and 8), lenslets 292 of the MLA 290 are arranged in a honeycomb pattern per FIG. 8. But unlike the MLA 160 of FIGS. 7-8, the MLA 290 includes lenslets 292 having different properties, e.g., height, radius of curvature, pitch, and index of refraction. Furthermore, the arrangement of the different lenslets 290 may be pseudo-random or ordered such that a group of lenslets may share the same properties. Although the SMLA expander 52 may be easier and less expensive to manufacture than the DMLA expander 52 of FIGS. 7-8, the SMLA may be unable to generate the parameters (e.g., expanded-beam intensity profile,) of the viewing space 30 as close to the desired levels as the DMLA expander 52 of FIGS. 7-8 can generate these parameters.

Referring again to FIGS. 7-8 and 13-19, additional embodiments of the exit-pupil expander 52 (FIG. 3) are contemplated. For example, one may design an exit-pupil expander 52 by combining selected features shown in any of the FIGS. 7-8 and 13-19. In one such example, one can modify the curved DMLA expander 52 of FIG. 14 by replacing the curved MLA 222 with a curved reflector in a manner similar to that shown in FIG. 17. Furthermore, one can use an ordered or random-ordered diffuser, such as a diffraction grating, for the exit-pupil expander 52. An example of a suitable diffraction grating is discussed in U.S. patent application Ser. No. 10/205,858 filed Jul. 26, 2002, U.S. patent application Ser. No. 10/889,963 filed Jul. 12, 2004, U.S. patent application Ser. No. 10/890,501, filed Jul. 12, 2004, and U.S. Pat. No. 6,768,588, issued on Jul. 27, 2004, which are incorporated by reference.

FIG. 20 is an isometric view of a portion of the expanded-beam projection assembly 54 (FIG. 3) and a dashboard shield 300 according to an embodiment of the invention. In addition to the aspheric mirror 58, the assembly 54 includes a mirror 302, mirror 304, and a cylindrical mirror 306.

The operation of the illustrated portion of the expanded-beam projection assembly 54 is discussed according to an embodiment of the invention. The mirror 302 directs the expanded beam 78 (which includes the beamlets 32 (FIG. 2) within the beam envelope 79 (FIG. 3)) onto the mirror 302, which directs the expanded beam 78 onto the mirror 306. The mirror 306, which is curved away from the mirror 58, further expands the expanded beam 78, and directs the expanded beam onto the aspheric mirror 58, which directs the expanded beam through the shield 300 and onto the wind screen 42 (FIG. 3).

As discussed above in conjunction with FIG. 3, an operator (not shown in FIG. 20) may adjust the position of the viewing space 30 (FIG. 2) for his particular height by rotating the mirror 58 or the entire heads-up display assembly about an axis 308 to move the viewing space 30 in the vertical (y) dimension. Alternatively, an automatic system (not shown in FIG. 20) can adjust the vertical position of the viewing space 30 by so rotating the mirror 58 or the entire heads-up display assembly. Also, as discussed above in conjunction with FIG. 3, the curvature of the mirror 58 is designed to optically compensate the curvature of the wind screen 42 so that the expanded beam 78 and displayed image does not stretch, distort or change position significantly as the operator moves their eyes inside the viewing space.

Still referring to FIG. 20, the shield 300, which may optionally be formed to reduce glare, is mounted within an opening formed in the vehicle dashboard (not shown in FIG. 20) or on top of the head-up display package to protect the mirror 58 and the other components of the heads-up display 40 (FIG. 3) and yet allow the expanded beam 78 (FIG. 3) to propagate from the mirror 58 to the wind screen 42 (FIG. 3). The shield may also be used to minimize glare from the sun or other external illumination sources that might otherwise be reflected off the heads-up display and into the operators eyes. Both the exposed (top) and unexposed (bottom) surfaces 310 and 312 of the shield 300 are treated with an antireflective coating, and the exposed surface is also treated with an anti-fingerprint coating such as Teflon®. Furthermore, the shield 300 may be made from any transparent material such as glass or plastic.

Alternative embodiments of the expanded-beam projection assembly 54 are contemplated. For example, the assembly 54 may include more or fewer mirrors than shown in FIG. 20, and may also include refractive, catadioptric and/or diffractive optical elements in addition to or in place of the lens 56 (FIG. 3).

Figure 21:
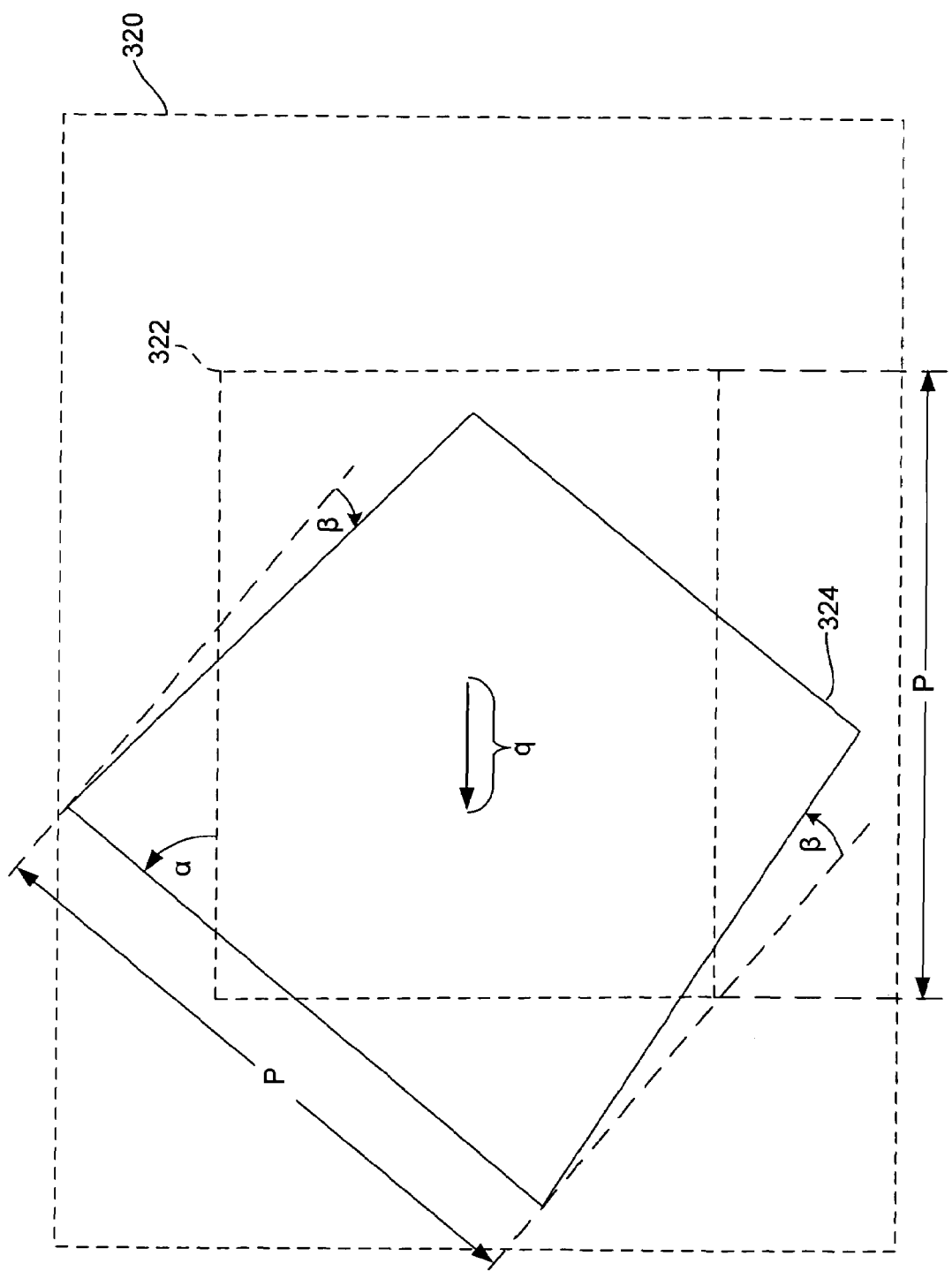
FIG. 21 is a diagram of a distorted virtual image generated by the heads-up display of FIG. 3 when the display is not calibrated to the wind screen.
Figure 22:
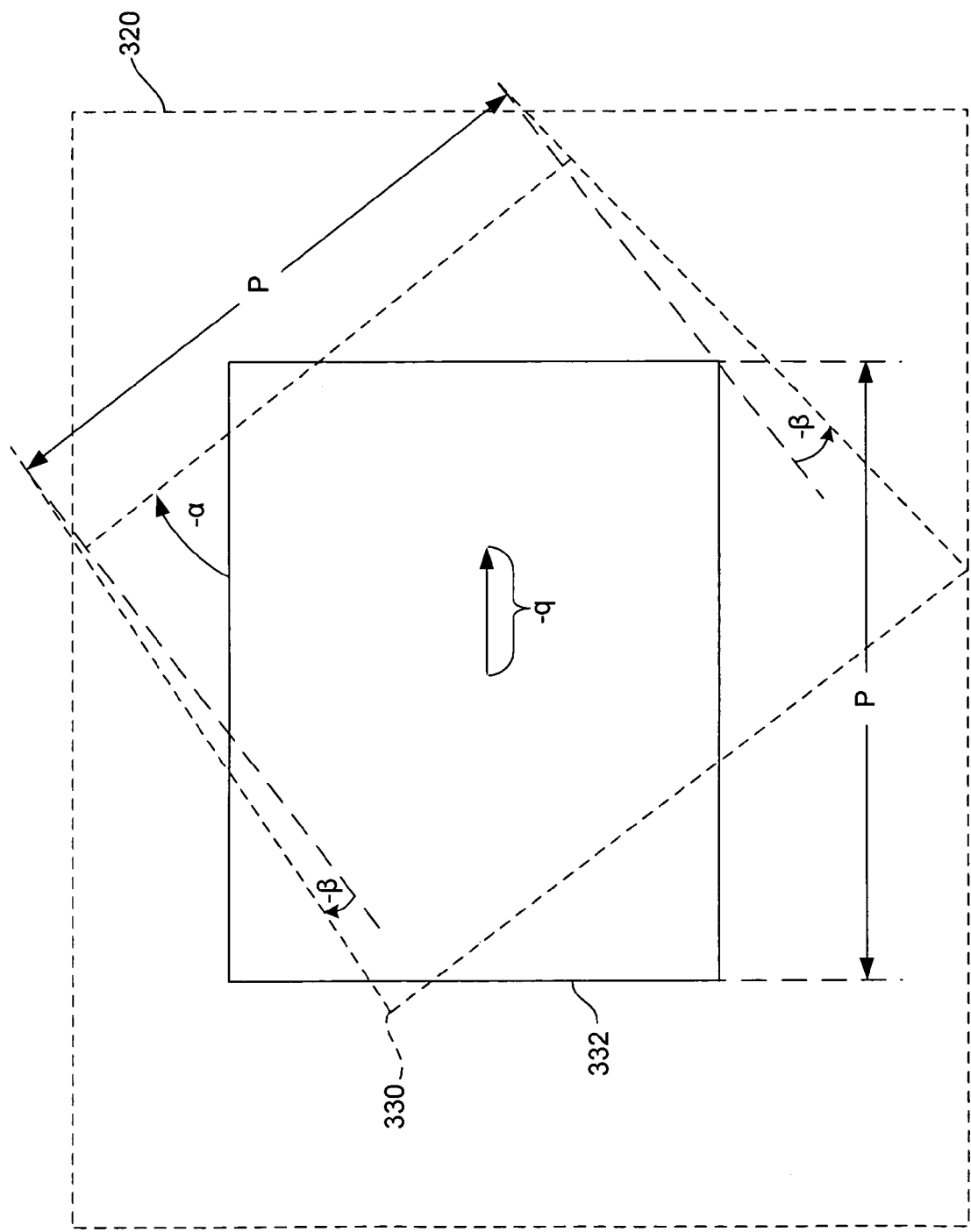
FIG. 22 is a diagram of an undistorted virtual image generated by the heads-up display of FIG. 3 after the display is calibrated to the wind screen according to an embodiment of the invention.

FIGS. 21 and 22 illustrate how one can electronically calibrate the heads-up display 40 (FIG. 3) to compensate for image distortion caused by the wind screen 42 or other factors according to an embodiment of the invention. Because the calibration is done electronically, it is often less complex and less expensive than a calibration technique that requires a modification to or a replacement of a component of the heads-up display 40 such as the aspheric mirror 58 (FIGS. 3 and 20).

FIG. 21 is an overlay of the available scanning area 320 of the exit-pupil expander 52 (FIG. 3), an image 322 that the beam 60 (FIG. 3) scans onto the area 320, and a distorted image 324 as perceived by an operator (not shown in FIG. 20) whose eyes are within the viewing space 30 (FIG. 2) according to an embodiment of the invention—the area 320 and the images 322 and 324 may not be drawn to scale. The image 322 is rectangular, has a width p, and is centered within the scanning area 320 of the exit-pupil expander 52.

With no distortion, the perceived image 324 would typically have the same shape, orientation, and relative location as the scanned image 322. Note that the apertures of the expanded beam 78 and the beamlets 32 (FIG. 2) have no affect on the shape of the scanned image 322; consequently, the heads-up display 40 can simultaneously generate the expanded beam and beamlets having hexagonal apertures and the image 322 having a rectangular shape. But the shape of the perceived image 324 is affected by distortion to the apertures of the expanded beam 78 and beamlets 32 as discussed below.

In this example, however, distortion causes the perceived image 324 to differ from the scanned image 322 in shape (trapezoidal vs. rectangular caused by a taper of $\beta$ in the width p), orientation (rotated counterclockwise by $\alpha=45°$ relative to the scanned image), and relative location (the center of the perceived image is shifted left a relative distance q from the center of the scanned image). More specifically, this distortion introduces an undesired taper$\beta$ to the apertures of the expanded beam 78 (this component of the distortion is often called "key stoning"), rotates the aperture of the expanded beam counterclockwise 45° from its desired orientation, and shifts the aperture of the expanded beam left from its desired location by a relative distance q. Such distortion is often caused by an optical mismatch between the wind screen 42 (FIG. 3) and the aspheric mirror 58 (FIGS. 3 and 20), although this distortion may have other causes. Typically, such distortion may exist when the vehicle (not shown in FIG. 21) incorporating the windscreen 42 (FIG. 3) is first assembled, or when the wind screen is replaced.

Still referring to FIG. 21, where the distortion in the perceived image 324 is caused by an optical mismatch between the wind screen 42 (FIG. 3) and aspheric mirror 58 (FIGS. 3 and 20), a conventional solution is to replace either the wind screen or the aspheric mirror or to modify the curvature of the mirror to obtain a better optical match with the windscreen. But because this solution requires replacement or modification of components and the calculation of the curvature of at least one of the wind screen 42 and mirror 58, this solution is often relatively time consuming and expensive.

But as discussed below, one can electronically calibrate or recalibrate the heads-up display 40 (FIG. 3) to compensate for such distortion according to an embodiment of the invention. Therefore, one can reduce or eliminate the distortion without replacing or modifying components or otherwise changing the physical structure of the display 40.

FIG. 22 is an overlay of the available scanning area 320 of the exit-pupil expander 52 (FIG. 3), an image 330 that the beam 60 (FIG. 3) scans onto the area 320 and that is operable to counteract distortion, and a distortion-compensated image 332 that is perceived as being substantially distortion free by an operator (not shown in FIG. 22) whose eyes are within the viewing space 30 (FIG. 2) according to an embodiment of the invention—the area 320 and the images 330 and 332 may not be drawn to scale. As discussed further below, the shape, orientation, and taper of the distortion-counteracting image 330 are the respective inverses of the shape, orientation, and taper of the distorted image 324 of FIG. 21.

Referring to FIGS. 21 and 22, one can calibrate the heads-up display 40 (FIG. 3) to correct the distorted image 324 by programming the display to scan the distortion-counteracting image 330 onto the exit-pupil expander 52 (FIG. 3) according to an embodiment of the invention. More specifically, one programs the beam generator 44 (FIG. 3) of the display 40 to effectively generate the distortion-counteracting image 332 from the original scanned image 322 by shifting the original image a distance q to the right (i.e., a distance −q to the left), rotating the shifted original image by an angle −$\alpha$, and tapering the sides of the shifted and rotated original image by an angle −$\beta$. The programmed image electronics 62 (FIG. 3) perform this shifting, rotating, and tapering by modulating the beam sources 64, 66, and 68 (FIG. 3) in an appropriate manner. To allow this shifting, rotating, and tapering, the area 320 of the exit-pupil expander 52 is larger, for example 15% larger, than the area of the original image 322.

Consequently, the same distortion that transformed the original scanned image 322 into the distorted image 324 now transforms the distortion-counteracting image 330 into the distortion-compensated image 332, which the operator perceives as being undistorted, i.e., as having the same relative, location, orientation, and shape as the original scanned image 322.

Because one can calibrate the heads-up display 40 by programming instead of physical modification, he can often perform such calibration more quickly and cheaply than he can perform a conventional calibration. Furthermore, one can automate the calibration by programming a test/calibration machine (not shown in FIGS. 21 and 22) to capture the distorted image 324, to calculate the parameters (e.g., shape, orientation, relative location) of the distortion-counteracting image 330 from the captured image, and to program the beam generator 44 for modulating the output beam 60 so that the scanner 44 scans the distortion-counteracting image onto the available area 320 of the exit-pupil expander 52 (beam generator, output beam, scanner, and exit-pupil expander shown in FIG. 3).

Still referring to FIGS. 21 and 22, other embodiments of the above-described distortion-calibration technique are contemplated. For example, one can program the beam generator 44 (FIG. 3) to correct distortions other than shift, rotational, and tapering distortions. For example, one can program the generator 44 to correct non-taper distortions to the shape of the image. Furthermore, one can program the beam generator 44 to modulate the intensity of the output beam 60 to correct distortions in the intensity profile of the expanded beam 78.

From the foregoing it will be appreciated that, although specific embodiments of the invention have been described herein for purposes of illustration, various modifications may be made without deviating from the spirit and scope of the invention. For example, referring to FIGS. 3, 21, and 22, the heads-up display 40 may scan an image onto the exit-pupil expander 52 using a tiling technique. That is, the display 40 can generate multiple beams 60 such that the scanner 46 sweeps multiple beams, each beam scanning a different portion of the image onto the exit-pupil expander 57. Tiling is discussed in U.S. patent application Ser. No. 09/858,287 filed May 15, 2001, U.S. Patent application Ser. No. 09/858,688 filed May 15, 2001, U.S. Pat. No. 6,755,536 issued on Jun. 29, 2004, and U.S. Pat. No. 6,639,719 issued on Oct. 28, 2003, which are incorporated by reference.

What is claimed is:

1. A heads-up display, comprising:
a scanner assembly operable to generate an image by sweeping a beam of electromagnetic energy in at least one dimension; and
a projection assembly operable to direct the image into a predetermined viewing space having a substantially uniform intensity profile in a cross section having a region that is substantially normal to a viewing dimension, wherein the projection assembly comprises an exit-pupil expander, and wherein the scanner is operable to generate the image by sweeping the beam in two dimensions onto the exit-pupil expander.

2. A heads-up display, comprising:
a scanner assembly operable to generate an image by sweeping a beam of electromagnetic energy in at least one dimension; and
a projection assembly operable to direct the image into a predetermined viewing space having a substantially uniform intensity profile in a cross section having a region that is substantially normal to a viewing dimension, wherein a planar projection of the cross section of the viewing space has a hexagonal shape.

3. A heads-up display, comprising:
a scanner assembly operable to generate an image by sweeping a beam of electromagnetic energy in at least one dimension; and
a projection assembly operable to direct the image into a predetermined viewing space having a substantially uniform intensity profile in a cross section having a region that is substantially normal to a viewing dimension, wherein a planar projection of the cross section of the viewing space has an elongated hexagonal shape.

4. A heads-up display, comprising:
a scanner assembly operable to generate an image by sweeping a beam of electromagnetic energy in at least one dimension; and
a projection assembly operable to direct the image into a predetermined viewing space having a substantially uniform intensity profile in a cross section having a region that is substantially normal to a viewing dimension, wherein the cross section of the viewing space is a planar cross section.

5. A heads-up display, comprising:
a scanner assembly operable to generate an image by sweeping a beam of electromagnetic energy in at least one dimension; and
a projection assembly operable to direct the image into a predetermined viewing space having a substantially uniform intensity profile in a cross section having a region that is substantially normal to a viewing dimension, wherein a planar projection of the cross section of the viewing space has one dimension of at least 100 millimeters.

6. A heads-up display, comprising:
a scanner operable to generate an image by sweeping a beam of electromagnetic energy in at least one dimension; and
a projection assembly that includes a first microlens array operable to direct the image into a predetermined viewing space, wherein the projection assembly comprises an exit-pupil expander, and wherein the scanner is operable to generate the image by sweeping the beam in two dimensions onto the exit-pupil expander.

7. The heads-up display of claim 6 wherein the first microlens array comprises lenslets, one of the lenslets having a first value for a lenslet property and another of the lenslets having a second value for the lenslet property.

8. The heads-up display of claim 6 wherein the projection assembly comprises a second microlens array disposed adjacent to the first microlens array such that the first and second microlens arrays are together operable to direct the image into the predetermined viewing space.

9. The heads-up display of claim 6 wherein:
the first microlens array has a focal plane and a focal length from the focal plane; and
the projection assembly further includes a second microlens array having a focal plane and the focal length from the focal plane, the focal plane of the second microlens array being substantially parallel to and spaced the focal length from the focal plane of the first microlens array.

10. The heads-up display of claim 6 wherein the first microlens array comprises lenslets arranged in a pattern and is operable to cause a planar projection of the cross section of the viewing space to have the pattern.

11. The heads-up display of claim 6 wherein the first microlens array comprises lenslets arranged in an elongated hexagonal pattern and is operable to cause a planar projection of the cross section of the viewing space to have the elongated hexagonal pattern.

12. A heads-up display, comprising:
a scanner operable to generate an image by sweeping a beam of electromagnetic energy in at least one dimension; and
a projection assembly having a mirror operable to reflect the image off of a wind screen and into a predetermined viewing space having a cross section, the mirror operable to maintain a dimension of the cross section at a substantially constant size for reflection of the image off of a predetermined region of the windshield, wherein the mirror is operable to move the viewing space in a dimension substantially parallel to the cross section.

13. A heads-up display, comprising:
a scanner operable to generate an image by sweeping a beam of electromagnetic energy in at least one dimension; and
a projection assembly having a mirror operable to reflect the image off of a wind screen and into a predetermined viewing space having a cross section, the mirror operable to maintain a dimension of the cross section at a substantially constant size for reflection of the image off of a predetermined region of the windshield, wherein the mirror is operable to move the viewing space in a dimension substantially normal to the cross section.

14. A heads-up display, comprising:
a scanner operable to generate an image by sweeping a beam of electromagnetic energy in at least one dimension; and
a projection assembly operable to direct the image into a predetermined viewing space such that in a cross section of the viewing space having a region that is substantially normal to a viewing dimension, the image has a substantially uniform intensity profile, wherein the projection assembly comprises an exit-pupil expander, and wherein the scanner is operable to generate the image by sweeping the beam in two dimensions onto the exit-pupil expander.

15. The heads-up display of claim 14, further comprising a beam generator operable to generate the beam of electromagnetic energy having a substantially uniform intensity profile in a planar cross section that is normal to a direction in which the beam propagates.

16. The heads-up display of claim 14, further comprising:
a beam generator operable to generate the beam of electromagnetic energy having a hexagonal aperture and a substantially uniform intensity profile in a planar cross section that is normal to a direction in which the beam propagates; and
wherein the cross section of the viewing space has a hexagonal shape.

17. The heads-up display of claim 14, further comprising:
a beam generator operable to generate the beam of electromagnetic energy having a hexagonal aperture and a substantially uniform intensity profile in a planar cross section that is normal to a direction in which the beam propagates;
wherein the cross section of the viewing space has a hexagonal shape; and
wherein the viewing space includes beamlets each having a hexagonal aperture and a substantially uniform intensity profile in a planar cross section that is substantially parallel to the planar cross section of the viewing space.

* * * * *